(12) United States Patent
Rabhi

(10) Patent No.: US 9,982,626 B2
(45) Date of Patent: May 29, 2018

(54) HEAT ENGINE OF TRANSFER-EXPANSION AND REGENERATION TYPE

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 303 days.

(21) Appl. No.: 15/009,881

(22) Filed: Jan. 29, 2016

(65) Prior Publication Data

US 2016/0252048 A1     Sep. 1, 2016

Related U.S. Application Data

(60) Provisional application No. 62/262,070, filed on Dec. 2, 2015, provisional application No. 62/120,489, filed on Feb. 25, 2015, provisional application No. 62/109,930, filed on Jan. 30, 2015.

(30) Foreign Application Priority Data

| Jan. 30, 2015 | (FR) | 15 50762 |
| Feb. 25, 2015 | (FR) | 15 51593 |
| Dec. 2, 2015 | (FR) | 15 61704 |

(51) Int. Cl.

| F02G 1/057 | (2006.01) |
| F02G 1/02 | (2006.01) |
| F02G 1/05 | (2006.01) |
| F02G 1/053 | (2006.01) |
| F02M 25/028 | (2006.01) |

(52) U.S. Cl.
CPC ............. *F02G 1/057* (2013.01); *F02G 1/02* (2013.01); *F02G 1/05* (2013.01); *F02G 1/0535* (2013.01); *F02M 25/028* (2013.01); *F02G 2250/03* (2013.01)

(58) Field of Classification Search
CPC .......... F02G 1/057; F02G 1/0535; F02G 1/05; F02G 2250/03; F02G 1/02; F02M 25/028
See application file for complete search history.

(56) References Cited

U.S. PATENT DOCUMENTS

| 4,004,421 A | * | 1/1977 | Cowans | .................... F02G 1/02 |
| | | | | 123/1 R |
| 5,264,051 A | * | 11/1993 | Huang | .................... C22C 14/00 |
| | | | | 148/421 |
| 5,634,339 A | * | 6/1997 | Lewis | ........................ F02C 1/04 |
| | | | | 60/650 |

(Continued)

*Primary Examiner* — Mark Laurenzi
*Assistant Examiner* — Shafiq Mian
(74) *Attorney, Agent, or Firm* — Young & Thompson

(57) ABSTRACT

The heat engine with transfer-expansion and regeneration (1) includes a compressor (2) which compresses gases in a high-pressure regeneration line (6) of a regeneration heat exchanger (5) from which they emerge preheated via a high-pressure regenerator outlet line (9) which has a heat source (12) that superheats the gases, the latter being then transferred by an admission metering valve (24) operated by a metering valve actuator (25) into a transfer-expansion chamber (16) formed in particular by an expansion cylinder (13) and an expansion piston (15), the gases leaving the chamber (16) after having been expanded via an expanded gas exhaust line (26) and thanks to an exhaust valve (31) operated by an exhaust valve actuator (32) before being cooled down in a low-pressure regeneration line (7) of the regeneration heat exchanger (5).

39 Claims, 14 Drawing Sheets

(56) References Cited

U.S. PATENT DOCUMENTS

| | | | | |
|---|---|---|---|---|
| 5,857,436 A * | 1/1999 | Chen | ................. | F02B 33/22 |
| | | | | 123/68 |
| 6,095,100 A * | 8/2000 | Hughes | ................. | F01B 9/047 |
| | | | | 123/25 C |
| 8,499,727 B1 * | 8/2013 | Pett, Jr. | ................. | F02B 75/18 |
| | | | | 123/190.1 |
| 8,596,230 B2 * | 12/2013 | Sturman | ................. | F02B 71/045 |
| | | | | 123/46 R |
| 8,656,712 B2 * | 2/2014 | Howes | ................. | F01K 3/12 |
| | | | | 60/515 |
| 9,551,292 B2 * | 1/2017 | Frazier | ................. | F01K 13/00 |
| 2005/0241302 A1 * | 11/2005 | Weber | ................. | F01L 13/0015 |
| | | | | 60/311 |
| 2009/0056329 A1 * | 3/2009 | Takeuchi | ................. | F02G 1/053 |
| | | | | 60/520 |
| 2009/0266337 A1 * | 10/2009 | Rabhi | ................. | F01B 9/047 |
| | | | | 123/48 B |
| 2017/0191405 A1 * | 7/2017 | Rabhi | ................. | F02B 17/005 |

* cited by examiner

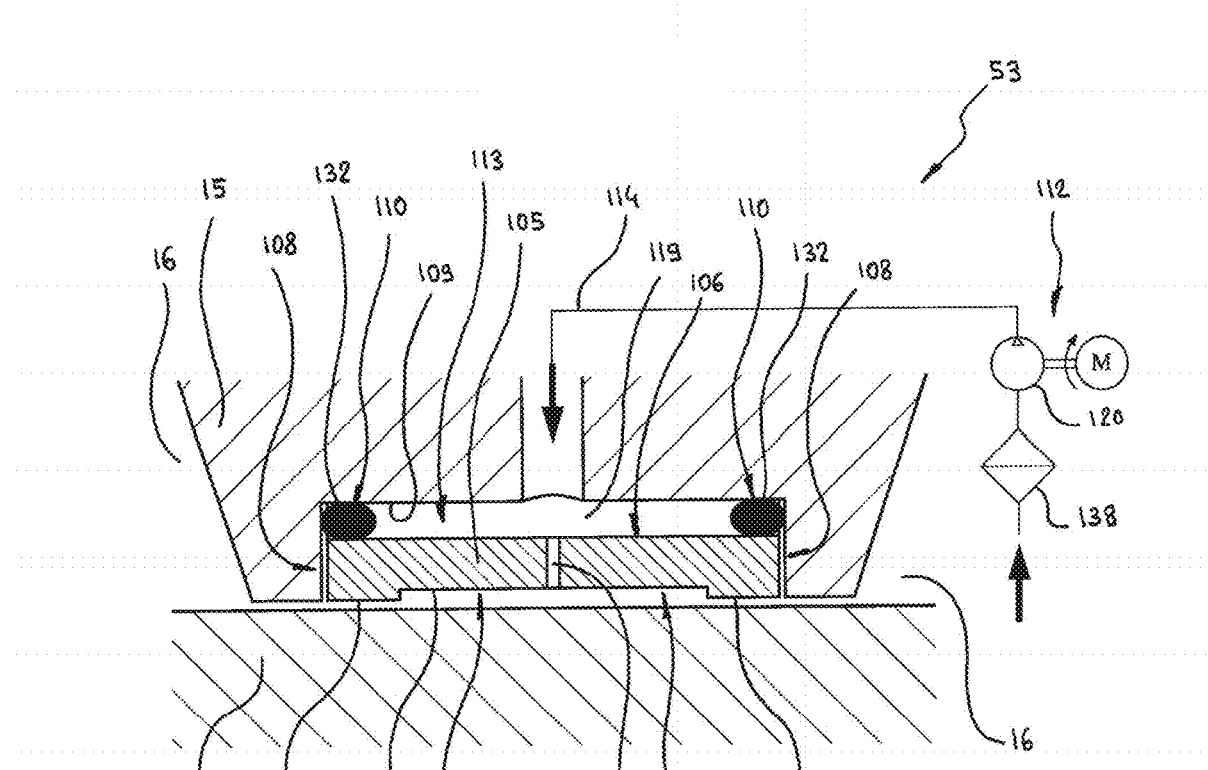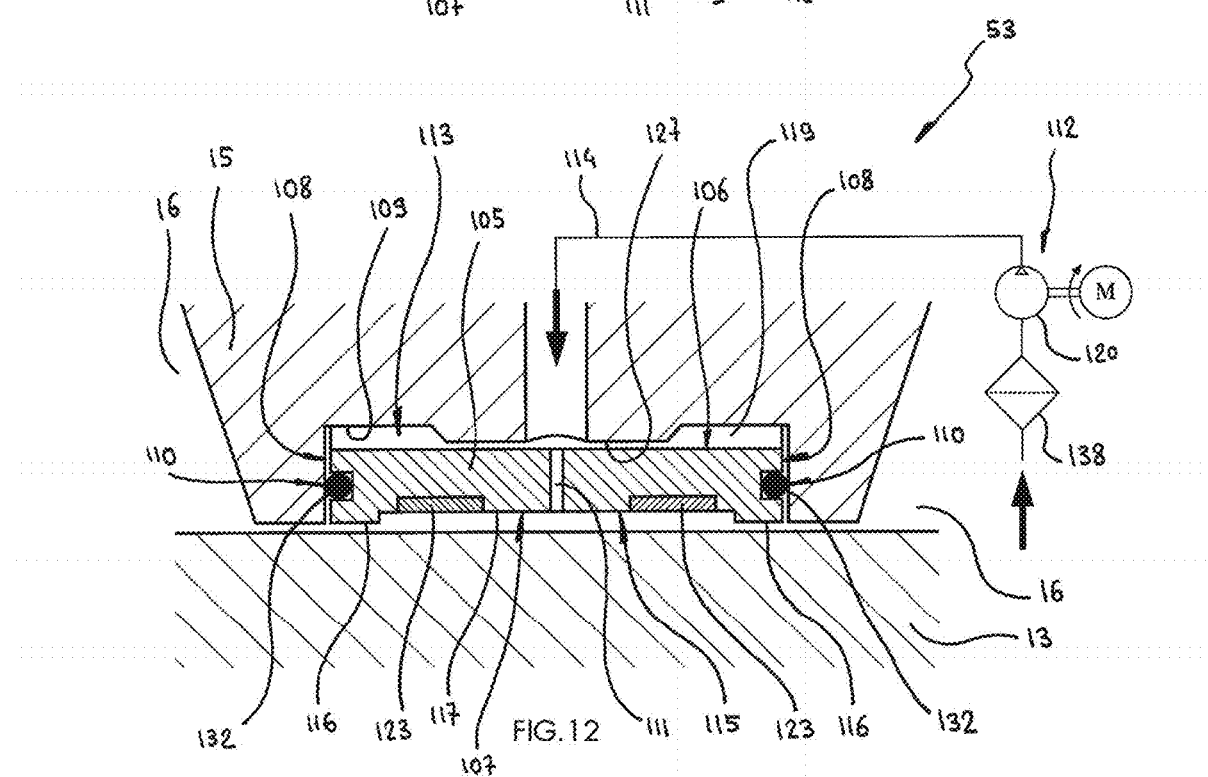

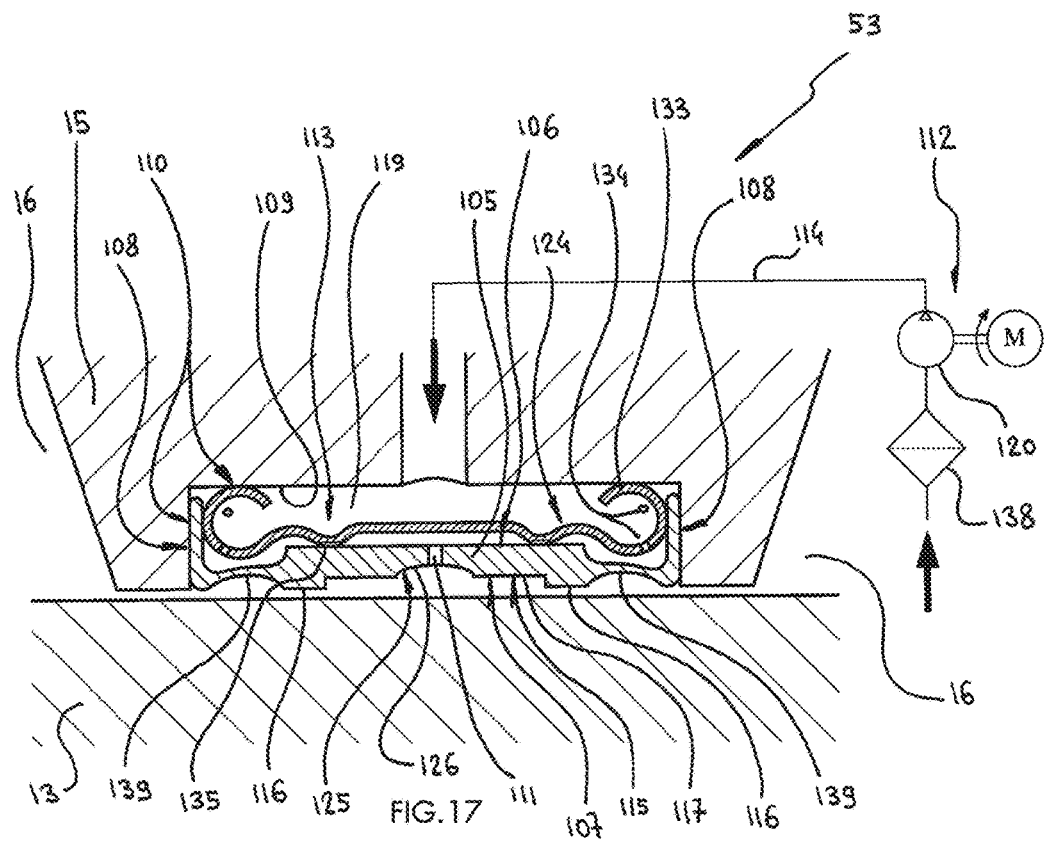
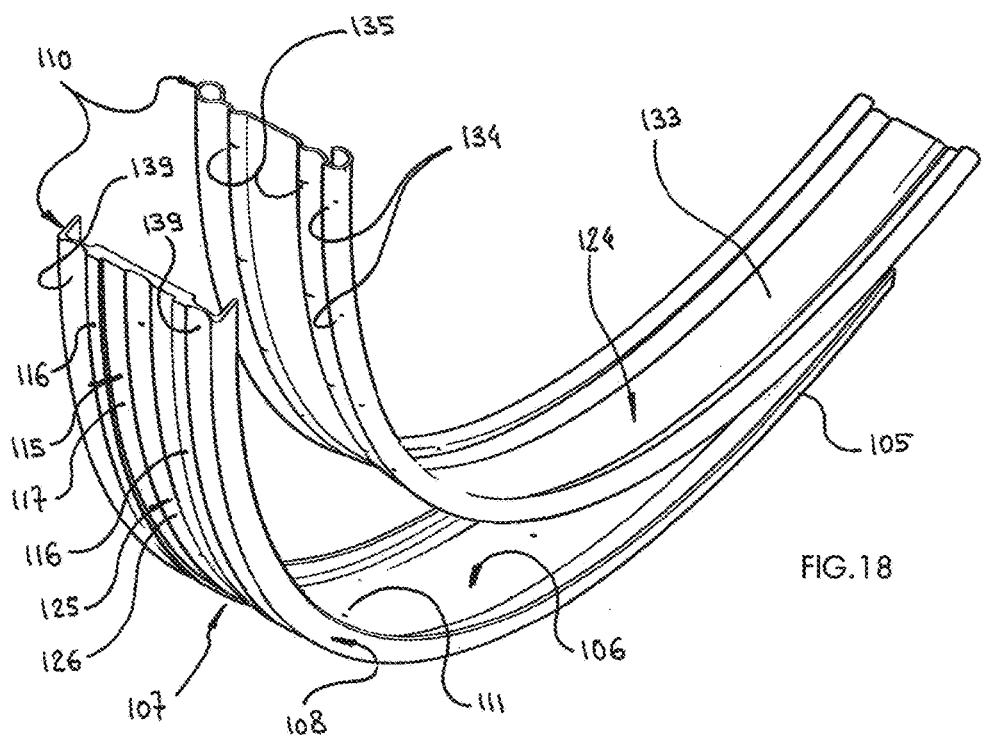

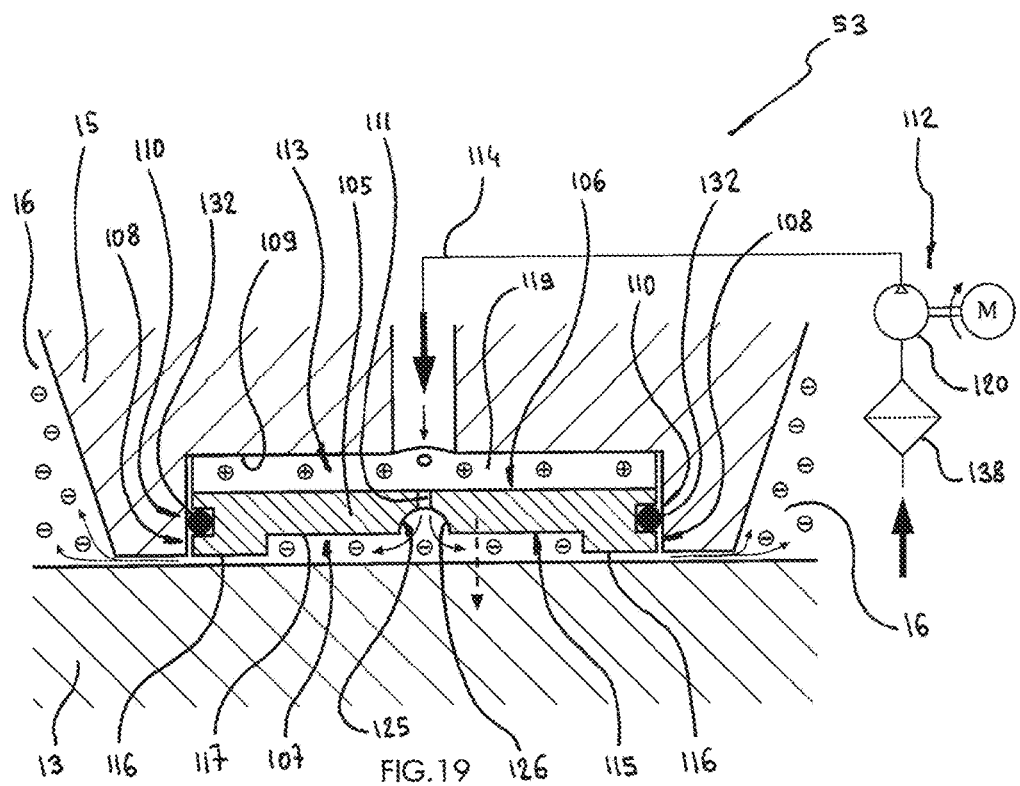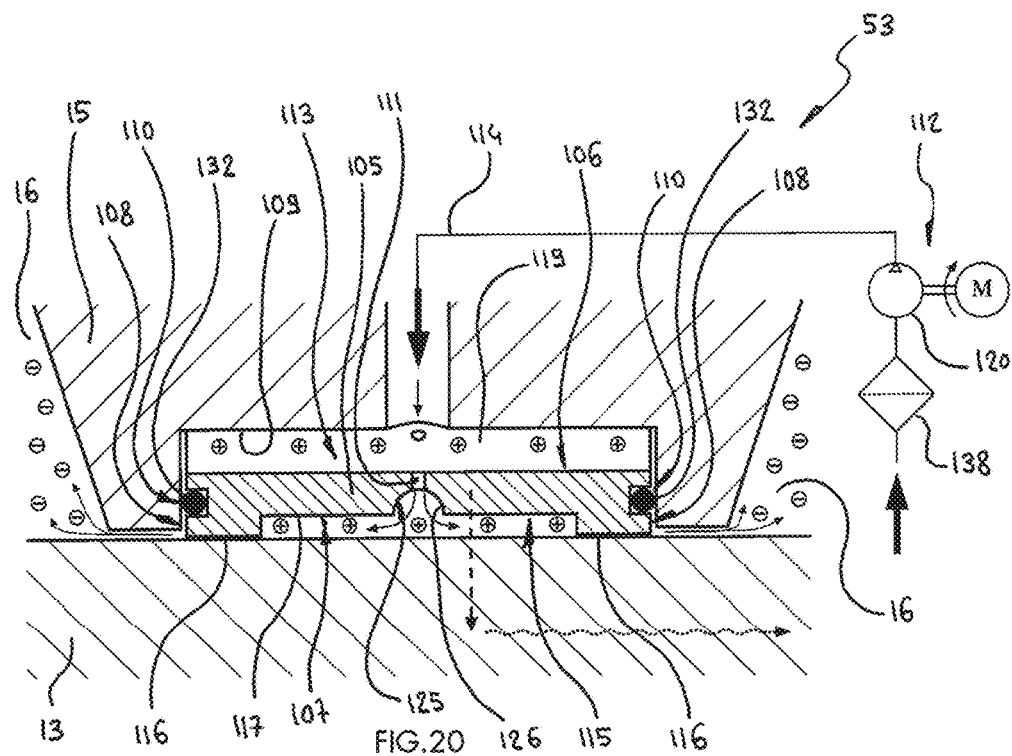

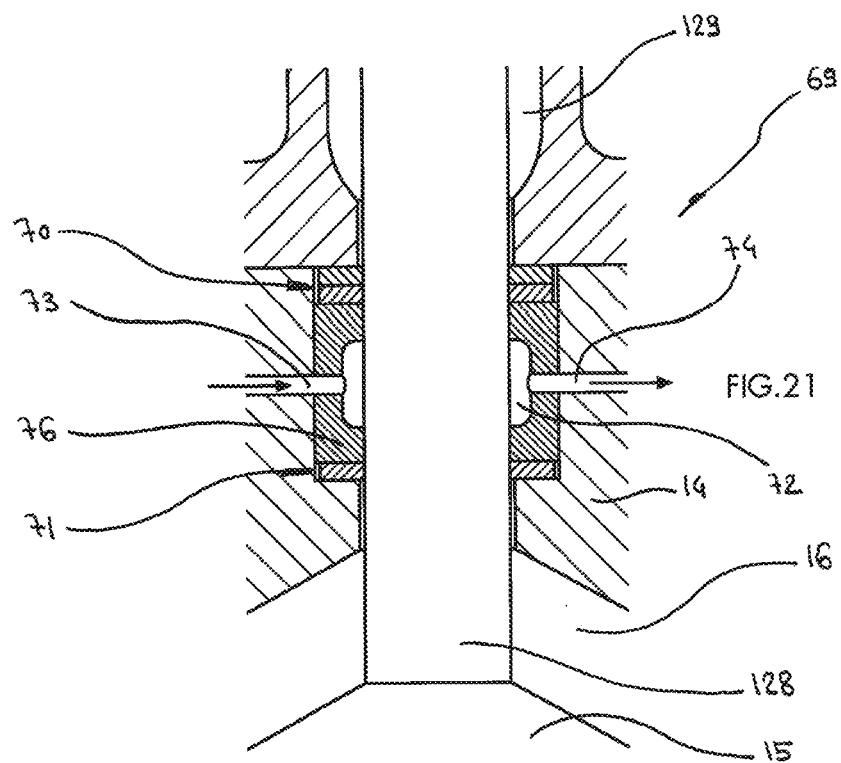
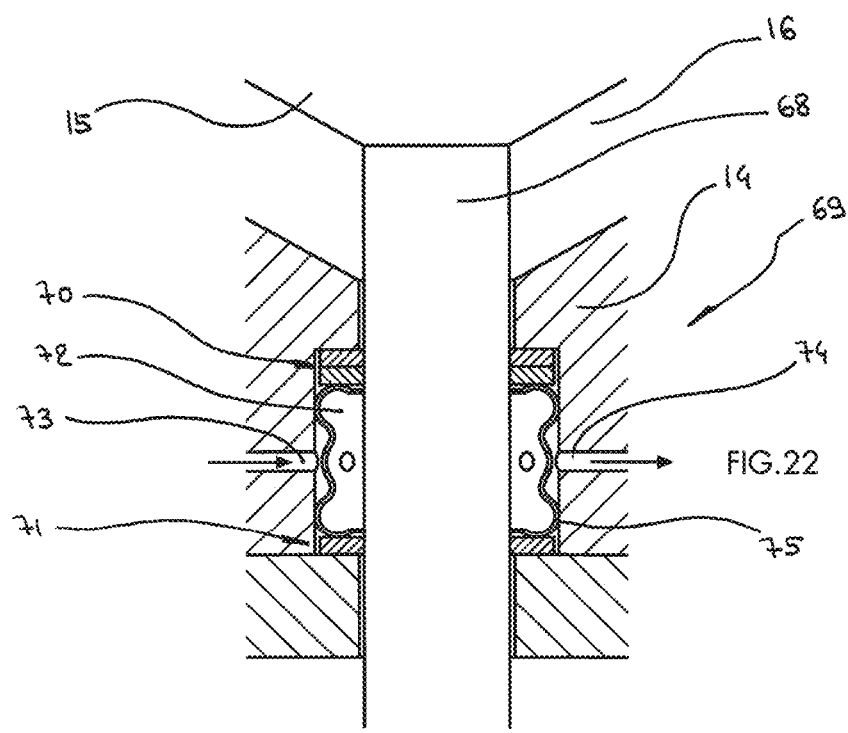

HEAT ENGINE OF TRANSFER-EXPANSION AND REGENERATION TYPE

The present invention pertains to a heat engine of transfer-expansion and regeneration type.

The most commonly used reciprocating internal combustion engines carry out the Otto or Beau de Rochas cycle in the case of positive-ignition engines, or the Diesel cycle in the case of compression ignition engines. Diverse variants of these cycles enable in particular better efficiency, such as the Miller cycle or the Atkinson cycle.

One distinguishes primarily four-stroke engines which perform their cycle in four piston movements and two-stroke engines which perform their cycle in only two piston movements.

The vast majority of positive-ignition engines put out a maximum efficiency hardly more than thirty five percent. The high-speed Diesel engines installed in automobiles or trucks put out a peak efficiency on the order of forty to forty five percent. Only the low-speed two-stroke Diesel engines of very large cylinder capacity surpass fifty percent efficiency at their best operating points. Thus, regardless of the type of application or the type of reciprocating internal combustion engine, between half and two thirds of the energy content of the fuel is wasted.

The energy losses essentially consist of heat emitted in the exhaust and heat carried away by the cooling system. The losses due to friction and the losses due to pumping also constitute a noteworthy energy loss, which also translates into a dispersion of heat in the surroundings. Of less importance, the unburned or partly burned fuel also amounts to a loss. These losses result from various limits intrinsic to the design of reciprocating internal combustion engines in the prior art.

In the first place, one notes that in these engines there is a great difference between the maximum temperature reached by the gases during their combustion, on the one hand, and on the other hand the temperature of the internal walls of said engines, that is, their cylinders, cylinder head, and piston caps. These walls are in fact cooled since, on the one hand, one needs to maintain at an acceptable temperature the oil covering them in a thin layer and lubricating the segments and the pistons, and on the other hand if the temperature of said walls is too high the fresh gases entering said cylinders are immediately overheated upon admission to said cylinders, which therefore limits the mass of said gases able to be introduced into said cylinders at a given admission pressure.

Moreover, especially in the case of positive-ignition engines, if the fresh gases are overly heated in the admission phase, their mixture with the fuel becomes prone to detonation, and one must either slow down the combustion or limit the compression. These two corrective actions decrease the efficiency of these engines. Moreover, if the fresh gases admitted are overly heated, their temperature at the end of combustion and at the start of expansion will be more elevated and they will produce more nitrogen oxides, which are pollutants. The cooling of the internal walls of conventional reciprocating internal combustion engines is thus indispensable. However, said cooling leads to a major loss of energy and efficiency, leading to an elevated fuel consumption.

Among the other limits intrinsic to the design of reciprocating internal combustion engines of the prior art, one notes that the admission of fresh gases, the burning of these gases, and then the expansion of these gases take place in the same chamber. Now, one would need a rather cold chamber to receive the fresh gases and a rather hot chamber to prevent heat losses when said gases are burned. Such is not the case.

The different phases of admission of fresh gases, pre-compression, combustion-expansion, and evacuation or "exhausting" take place in the same chamber and the same cylinder, so that these phases cannot take place at the same time and have to follow each other in time.

This sequencing means an intermittent combustion which needs to be initiated and developed in each cycle. Therefore, for each firing one needs to provide the necessary conditions for its proper occurrence in a very short time. These conditions vary greatly depending on the engine operating speed and load. Hence, there is a major production of unburned fuel, a combustion occurring at variable volume since one needs to allow it the time to develop without it being possible to halt the piston, and a great sensitivity to the nature of the fuel which needs to catch fire without detonation under positive ignition, and which needs to burn in all circumstances in the Diesel despite the absence of any ignition spark.

In the case of positive-ignition engines, one can mention the extreme importance of homogeneity and composition of the charge admitted to the cylinders and especially the air-fuel ratio, not only for reasons of inflammability of said charge, but also for reasons of aftertreatment of the pollutants produced by the combustion of said charge, for example, in a three-way catalytic converter.

One also notes the strong dependence of these engines on the compression ratio. In theory, this should be as high as possible in order to achieve a maximum expansion of the gases and recover the maximum work at the piston. In practice, the limits of detonation of the fuel and the control of the heat exchange with the internal walls of the engine set the allowable compression ratio for the latter well before the theoretically ideal compression ratio for the efficiency.

As the combustion of engines with an Otto or Diesel cycle occurs in a very short time, one notes the particular sensitivity of these engines to the connecting rod/crank ratio which governs the law of variation of the volume of the combustion chamber. As the combustion here does not occur at constant volume, a portion of the combustion occurs prior to the top dead center of the piston in a volume which is decreasing, resulting in a needlessly elevated temperature of the gases and heat losses harmful to the thermodynamic efficiency, while the other portion of said combustion occurs after the top dead center of the piston in a volume which is increasing so that a portion of that combustion occurs during the expansion, which likewise is harmful to said thermodynamic efficiency.

The sequential nature of the Otto or Diesel cycles likewise means generating the necessary turbulence to guarantee a sufficient air/fuel homogeneity, and to bend the flame front in order to favor a propagation into the volume of the combustion chamber. Besides generating additional pumping losses, said turbulence increases the heat exchange between the hot gases and the walls presented by the cylinder, the cylinder head and the piston. In this way, said turbulence increases the heat losses, which limit the efficiency.

Once the expansion of the burned gases occurs to recover the work, the gases are evacuated to the atmosphere without the engine allowing the residual heat to be reutilized.

As an alternative to the reciprocating internal combustion engines of the prior art, centrifugal turbine engines of the Brayton cycle are known, with regeneration. The most evolved version of these engines is beyond question the one providing at least two compressor stages with intermediate cooler. This configuration enables the best operation of the regeneration exchanger and it is implemented for example in the Rolls-Royce WR-21 engine designed for certain military ships. The efficiency of these engines surpasses forty percent.

These engines have the advantage of having no longer a sequential, but rather a continuous combustion, and of separating in space and assigning to dedicated elements the different phases of the thermodynamic cycle, namely, the admission, the compression, the combustion, the expansion, and the exhaust.

Unfortunately, these Brayton cycle engines with regeneration in the end only offer a slightly better efficiency than that of positive-ignition engines. This efficiency is comparable to that of the high-speed Diesel engines and lower than that of the slow-speed two-stroke Diesel engines with very large cylinder capacity. Moreover, the energy efficiency of the Brayton cycle engines with regeneration falls rapidly outside the power range where they produce their best efficiency. What is more, their response time is slow in power transients. For this reason, their field of application is limited.

Another well-known limit of the Brayton cycle engines with regeneration is their strong dependence on the efficiency of the centrifugal compressors and turbines of which they are composed. In the current art and state of engineering, the efficiency of these components is limited, and the remaining progress margins do not suggest any technological leap in the short term able to make these engines competitive with the reciprocating engines of the Diesel cycle.

Even so, calculations show that a Brayton cycle engine with regeneration, outfitted with a driving turbine and two staged turbocompressors with intermediate cooler, could theoretically produce a very elevated total efficiency, more than fifty percent. To do so, it is necessary for the centrifugal compressors and turbines of which it is composed to have an efficiency on the order of eighty five to ninety percent, while that of the regeneration exchanger needs to be on the order of ninety five percent. If one further boosts the efficiency of these elements, the final efficiency can rise to seventy percent or more for temperatures of combustion on the order of only one thousand to eleven hundred degrees Celsius.

Unfortunately, these gas compression and expansion efficiencies are virtually beyond the reach of centrifugal turbines and compressors. Even so, these efficiencies are theoretically within the reach of piston machines, provided that their volumetric efficiency is sufficient and the pumping and friction losses which they generate are sufficiently low. The necessary efficiencies mentioned for exchangers of countercurrent temperature are also within reach.

The problem lies primarily in the design of an expansion cylinder whose temperature of the internal walls is closes to the very elevated temperature of the combustion gases, which is on the order of a thousand degrees Celsius or more. Such a cylinder must remain durable, tight, and mechanically reliable.

The first problem is the means of tightness between said cylinder and the piston with which it cooperates, for no such means exist in the current state of the art. The making of such means of tightness is one of the objectives of the heat engine with transfer-expansion and regeneration according to the invention. This engine also intends to provide its expansion cylinder with good tightness and resistance to the very high temperatures of centrifugal turbines.

Being thus provided with this first indispensable characteristic, said engine can implement the equivalent of a Brayton cycle with regeneration no longer with centrifugal compressors and turbines, but with volumetric compressors and an expansion cylinder having an reciprocating piston.

It will also be noted that, besides the designing of a cylinder compatible with very high temperatures, the heat engine with transfer-expansion and regeneration according to the invention proposes to control the filling and emptying of said cylinder to better exploit the phases of transfer and expansion, which are productive of work.

The result of the invention is a heat engine with transfer-expansion and regeneration:

Whose phases of admission-compression, combustion and expansion-exhaust are separated, and entrusted to dedicated elements designed and dimensioned to support their specific mechanical and thermal load as much as is needed;

Where the residual heat of the expanded gases is in large measure recycled to produce supplemental work resulting in minimal heat losses;

Where the temperature of the walls of the expansion cylinder is close to that of the hot gases before they have been expanded, resulting in minimal heat losses;

Whose principal components do not need cooling, resulting in minimal heat losses;

Whose connecting rod/crank ratio has no influence on the efficiency;

Whose geometric volumetric ratio is of no consequence to the efficiency, the latter being close to that produced by an infinite volumetric ratio;

Whose combustion of the air/fuel mixture can occur over a large range of richness and large air surplus as compared to stoichiometry;

Whose combustion is continuous and not dependent on the propagation of a flame front in the three-dimensional space of a combustion chamber;

Where the combustion—besides being continuous and realized with air excess—occurs at a maximum temperature which is lower than that found in conventional reciprocating combustion engines, this conjunction of conditions for realization of said combustion making it possible to produce few pollutants at the source so as to reduce or eliminate the need for an oxidation catalyst, a three-way catalytic converter, or any device for aftertreatment of nitrogen oxides or particle filtration.

Which can have internal or external combustion, in the latter case the combustion being possibly replaced by a sufficiently intense heat source of solar, nuclear, or any other origin;

Which can consume any kind of liquid fuel, such as gas oil, gasoline of any grade, ethanol or any type of alcohol, or any gaseous fuel such as liquefied petroleum gas, methane or hydrogen;

Which, especially if there is external combustion, can consume coal, wood, or any combustible solid waste;

Whose range of speed and power for which an elevated energy efficiency occurs is significantly larger than that of turbine engines;

Whose transient load and/or speed responsiveness is greater than that of turbine engines;

Whose acoustic and vibration emissions are lower than those of conventional reciprocating internal combustion engines, whether positive-ignition or Diesel type, due to a maximum pressure and maximum pressure gradient in its expansion cylinder which are much lower than those in the cylinders of said conventional engines, and due to less pressure of the expansion gases when they are vented into the surroundings;

Whose efficiency is little dependent on the unit cylinder capacity and whose reliability and efficiency are practically independent of any dimension or high or low power;

Whose efficiency of converting heat into work is much greater than that of conventional reciprocating internal combustion engines regardless of the principle, resulting in a lower fuel consumption for the same work provided than that of said conventional engines and also lower associated emissions of carbon dioxide.

It is understood that the heat engine with transfer-expansion and regeneration according to the invention is adaptable to any machine or apparatus requiring a driving source in order to be displaced and/or move, such as an automobile, a motorcycle, a truck, a locomotive, a ship, a construction, handling, lifting or military machine or any other automotive machine. The heat engine with transfer-expansion and regeneration according to the invention can also produce the driving power needed for stationary apparatus such as an electricity generator, a hydraulic pump, or any industrial or household machine requiring a source of movement.

These sample applications of the heat engine with transfer-expansion and regeneration according to the invention are given as nonlimiting examples.

The other characteristics of the present invention have been described in the specification and in the secondary claims depending directly or indirectly on the main claim.

The heat engine with transfer-expansion and regeneration according to the present invention comprises:

At least one compressor able to aspirate gases at a certain pressure via a compressor inlet line and drive them out at a higher pressure in a compressor outlet line;

At least one regeneration heat exchanger comprised of at least one high-pressure regeneration line and at least one low-pressure regeneration line, a first end of said high-pressure line being connected to the compressor outlet line while the gases circulating in the low-pressure regeneration line can surrender a portion of their heat to the gases circulating in the high-pressure regeneration line;

At least one regenerator high-pressure outlet line having a first end connected to a second end comprising the high-pressure regeneration line;

At least one heat source placed in any given location of the regenerator high-pressure outlet line and which can superheat gases circulating in said line;

At least one expansion cylinder, at least one end of which is closed by an expansion cylinder head integrated in said cylinder or attached to the latter, said cylinder housing an expansion piston with which it produces a tightness to form a transfer-expansion chamber of variable volume, said piston being able to move in said cylinder and being directly or indirectly connected to a power output shaft by mechanical transmission means so as to impart to said shaft a continuous rotation movement when said piston performs reciprocating movements in the expansion cylinder;

At least one admission line for hot gases, having a first end connected to a second end comprising the regenerator high-pressure outlet line, said admission line having a second end which passes through the expansion cylinder head to empty into the expansion cylinder via a mouth of the hot gas admission line;

At least one admission metering valve operated by a metering valve actuator, said valve being able to open or block the mouth of the hot gas admission line;

At least one exhaust line for the expanded gases, having a first end which passes through the expansion cylinder head to empty into the expansion cylinder via a mouth of the expanded gas exhaust line, said exhaust line also having a second end connected to a first end comprising the low-pressure regeneration line;

At least one exhaust valve operated by an exhaust valve actuator, said valve being able to open or block the mouth of the expanded gas exhaust line;

At least one engine outlet line placed in a prolongation of a second end comprising the low-pressure regeneration line, or combined with said second end to constitute a single piece with the latter.

The heat engine with transfer-expansion and regeneration according to the present invention comprises a two-stage compressor comprised of a low-pressure compressor whose outlet is connected to the inlet of a high-pressure compressor via an intermediate compressor cooler.

The heat engine with transfer-expansion and regeneration according to the present invention comprises a power output shaft which drives the compressor in rotation.

The heat engine with transfer-expansion and regeneration according to the present invention comprises a compressor inlet line having a water injector which can spray liquid water into the gases circulating in said line before said gases are admitted into a suction-delivery chamber which is defined by the compressor aspirating them.

The heat engine with transfer-expansion and regeneration according to the present invention comprises a compressor which defines a suction-delivery chamber in which a water injector empties, the latter being able to spray liquid water into the gases admitted into said chamber after said gases have been aspirated via the compressor inlet line by said compressor.

The heat engine with transfer-expansion and regeneration according to the present invention comprises a compressor outlet line having an air/water separator.

The heat engine with transfer-expansion and regeneration according to the present invention comprises an engine outlet line comprising a condensation gas dryer.

The heat engine with transfer-expansion and regeneration according to the present invention comprises a compressor having a compressor admission metering valve whose opening and closing are controlled by a compressor admission metering valve actuator, said valve being able to open and make a connection between the compressor inlet line and a suction-delivery chamber which is defined by the compressor.

The heat engine with transfer-expansion and regeneration according to the present invention comprises a high-pressure regeneration line and a low-pressure regeneration line which are placed side by side for all or some of their length, the direction of circulation of the gases contained in the high-pressure regeneration line being opposite the direction of circulation of the gases contained in the low-pressure regeneration line, the two said lines constituting a counterflow heat exchanger.

The heat engine with transfer-expansion and regeneration according to the present invention comprises a heat source which is a burner composed of a fuel injector and a combustion chamber.

The heat engine with transfer-expansion and regeneration according to the present invention comprises a heat source which is composed of a primary heat exchanger which extracts heat from a universal heat source to transmit said heat to the gases circulating in the high-pressure regenerator line directly, or via a secondary heat transport circuit.

The heat engine with transfer-expansion and regeneration according to the present invention comprises an expansion cylinder head having a pressure equalizing gate which blocks or leaves open a line connecting the transfer-expansion expansion chamber and the hot gas admission line, said gate being open if the pressure prevailing in the transfer-expansion chamber is greater than that prevailing in the hot gas admission line, so that the gases pass from said chamber to said line, the gate being otherwise closed so that said gases cannot pass from said line to said chamber via said gate.

The heat engine with transfer-expansion and regeneration according to the present invention comprises a transfer-expansion chamber which has at least one temperature maintaining fuel injector.

The heat engine with transfer-expansion and regeneration according to the present invention comprises a transfer-expansion chamber having at least one anti-NOx water injector.

The heat engine with transfer-expansion and regeneration according to the present invention comprises an expansion piston which is connected to the mechanical means of transmission by an expansion piston rod which passes through the expansion cylinder head, a seal being achieved between said rod and said cylinder head by rod sealing means.

The heat engine with transfer-expansion and regeneration according to the present invention comprises rod sealing means which comprise an upper rod seal and a lower rod seal, sufficiently spaced apart to form—between the two said seals—an oil circulation chamber in which empties a cooling and lubrication oil supply line and from which emerges a cooling and lubrication oil outlet line.

The heat engine with transfer-expansion and regeneration according to the present invention comprises rod sealing means which cooperate with a rod guide collar lodged inside or outside the oil circulation chamber.

The heat engine with transfer-expansion and regeneration according to the present invention comprises mechanical means of transmission composed of a connecting rod, one of whose ends articulates directly or indirectly in the expansion piston and the other end articulates about a crank integrated with the power output shaft.

The heat engine with transfer-expansion and regeneration according to the present invention comprises an admission metering valve and/or the exhaust valve which is guided directly or indirectly in a valve cage housed in the expansion cylinder head, said cage having a seat on which said valve can rest to form a seal, while said seat and/or the portion of the valve cage guiding said valve is cooled by a valve cooling circuit in which a heat transfer fluid circulates.

The heat engine with transfer-expansion and regeneration according to the present invention comprises an expansion piston having piston sealing means.

The heat engine with transfer-expansion and regeneration according to the present invention comprises piston sealing means which comprise:
- At least one continuous perforated ring, having an internal cylindrical ring surface, an external cylindrical ring surface and two axial ring surfaces, said ring being lodged in at least one annular groove arranged in the expansion piston while said ring can move radially in the annular groove without being able to exit from the latter;
- Ring sealing means which produce a seal between each axial ring surface and the annular groove, so that the latter defines with the continuous perforated ring a pressure distribution chamber connected by a transfer circuit to a source of pressurized fluid;
- At least one calibrated orifice passing entirely through the continuous perforated ring in its radial thickness;
- At least one air cushion floating surface of the continuous perforated ring, said floating surface being arranged opposite the pressure distribution chamber.

The heat engine with transfer-expansion and regeneration according to the present invention has piston sealing means which comprise at least one counterpressure cavity which is not axially emergent and which is hollowed out at the external cylindrical ring surface so that the surface of the external cylindrical ring surface not occupied by said cavity constitutes the air cushion floating surface.

The heat engine with transfer-expansion and regeneration according to the present invention has piston sealing means which comprise a counterpressure cavity which is composed of a counterpressure groove of slight depth, more or less centered on the axial length of the external cylindrical ring surface, said counterpressure groove being made on the entire circumference of said external cylindrical ring surface.

The heat engine with transfer-expansion and regeneration according to the present invention has a calibrated orifice emerging into said counterpressure cavity.

The heat engine with transfer-expansion and regeneration according to the present invention comprises a calibrated orifice emerging into the counterpressure cavity by means of a pressure distribution cavity hollowed out at the bottom of said counterpressure cavity.

The heat engine with transfer-expansion and regeneration according to the present invention comprises a pressure distribution cavity composed of a pressure distribution groove more or less centered on the axial length of the external cylindrical ring surface, said pressure distribution groove being made on the entire circumference of said external cylindrical ring surface.

The heat engine with transfer-expansion and regeneration according to the present invention has at least one of the two axial edges of the external cylindrical ring surface or the internal cylindrical ring surface which receive the counterpressure cavity terminating in an edge plating clearance.

The heat engine with transfer-expansion and regeneration according to the present invention comprises ring sealing means which are composed of a ring sealing lip integrated with the continuous perforated ring on the one hand, and establishing a tight contact with the inside or the rim of the annular groove on the other hand.

The heat engine with transfer-expansion and regeneration according to the present invention comprises ring sealing means which are composed of a thinned axial portion disposed near at least one of the axial ends of the continuous perforated ring, said portion being integrated with the annular groove in tight manner, and being sufficiently flexible to allow the diameter of the continuous perforated ring to expand or decrease with respect to that of said groove.

The heat engine with transfer-expansion and regeneration according to the present invention comprises a continuous perforated ring made of a flexible material and comprising at least one circumferential annular spring which tends to reduce the diameter of said ring.

The heat engine with transfer-expansion and regeneration according to the present invention comprises a pressure distribution chamber which houses means of diffusion of ring fluid which force the ring fluid coming from the pressure transfer circuit to sweep the largest possible surface of the internal cylindrical ring surface before escaping via the calibrated orifice.

The heat engine with transfer-expansion and regeneration according to the present invention comprises means of diffusion of ring fluid which are composed of a diffusion plate lodged at the bottom of the annular groove, at least one of the axial ends of said plate being provided with at least one orifice or lateral groove of the diffusion plate which forces the ring fluid coming from the pressure transfer circuit to empty into the pressure distribution chamber by at least one of its axial ends.

The heat engine with transfer-expansion and regeneration according to the present invention comprises an annular groove having a radial annular end stop which limits the penetration of the continuous perforated ring into said groove.

The heat engine with transfer-expansion and regeneration according to the present invention comprises a pressure transfer circuit which is composed of a pressure inlet pipe, parallel to the expansion cylinder and integrated with the expansion piston, a first end of said pipe emptying inside said piston while the second end of said pipe empties, via a bore of the pressure chamber in which it can be displaced longitudinally and in tight manner, into a pressure chamber connected to the source of pressurized fluid.

The heat engine with transfer-expansion and regeneration according to the present invention comprises a pressure inlet pipe which is connected to the pressure distribution chamber by at leas one radial pressure inlet line.

The heat engine with transfer-expansion and regeneration according to the present invention comprises a pressure chamber which is connected to the source of pressurized fluid via a proportional pressure check valve which allows the ring fluid to go from said source to said chamber, but not from said chamber to said source.

The heat engine with transfer-expansion and regeneration according to the present invention comprises an annular groove which houses an expansion spring which bears against said groove to exert a radial force on the internal cylindrical ring surface.

The heat engine with transfer-expansion and regeneration according to the present invention comprises an expansion spring which produces by contact a seal between the annular groove and the continuous perforated ring.

The heat engine with transfer-expansion and regeneration according to the present invention comprises an expansion spring which is provided with at least one fluid diffusion orifice and/or at least one fluid diffusion groove so as to constitute with said orifice and/or said groove the means of diffusion of ring fluid.

The following specification in regard to the appended drawings and given as nonlimiting examples will allow a better comprehension of the invention, its characteristics, and the advantages which it is able to provide:

FIG. 1 is a schematic representation of the heat engine with transfer-expansion and regeneration according to the invention seen from above, the compressor comprising a low-pressure compressor, a high-pressure compressor and an intermediate compressor cooler, while the heat source is composed of a burner and the piston sealing means are composed in particular of a continuous perforated ring.

FIG. 2 is a schematic representation of the heat engine with transfer-expansion and regeneration according to the invention in side view, the compressor comprising a low-pressure compressor, a high-pressure compressor and an intermediate compressor cooler, while the heat source is composed of a primary heat exchanger which extracts heat from a universal heat source, and the piston sealing means are composed in particular of a continuous perforated ring.

FIG. 3 is a schematic representation of the heat engine with transfer-expansion and regeneration according to the invention in side view, the compressor being single stage, with dual-action piston, outfitted with compressor admission metering valves driven by a compressor admission metering valve actuator, and cooperating with a water injector which sprays liquid water into the gases circulating in the compressor inlet line, said water being then recovered by an air/water separator, and then by a condensation gas dryer.

FIGS. 4 and 5 are respectively a three-dimensional cutaway view and a three-dimensional exploded view of a portion of the heat engine with transfer-expansion and regeneration according to the invention when the piston sealing means are composed in particular of a continuous perforated ring, said portion including in particular mechanical means of transmission and an expansion cylinder defining with the expansion piston with which it cooperates two transfer-expansion chambers, each one closed by an expansion cylinder head.

FIG. 11 is a sectional schematic view of the piston sealing means of the heat engine with transfer-expansion and regeneration according to the invention particularly when they are composed of a continuous perforated ring, the ring sealing means being composed of an O-ring.

FIG. 12 is a sectional schematic view of the piston sealing means of the heat engine with transfer-expansion and regeneration according to the invention particularly when they are composed of a continuous perforated ring, the annular groove having a radial annular end stop which limits the penetration of the continuous perforated ring in said groove, while said ring is composed of a flexible material and comprises a circumferential annular spring.

Figure 13:
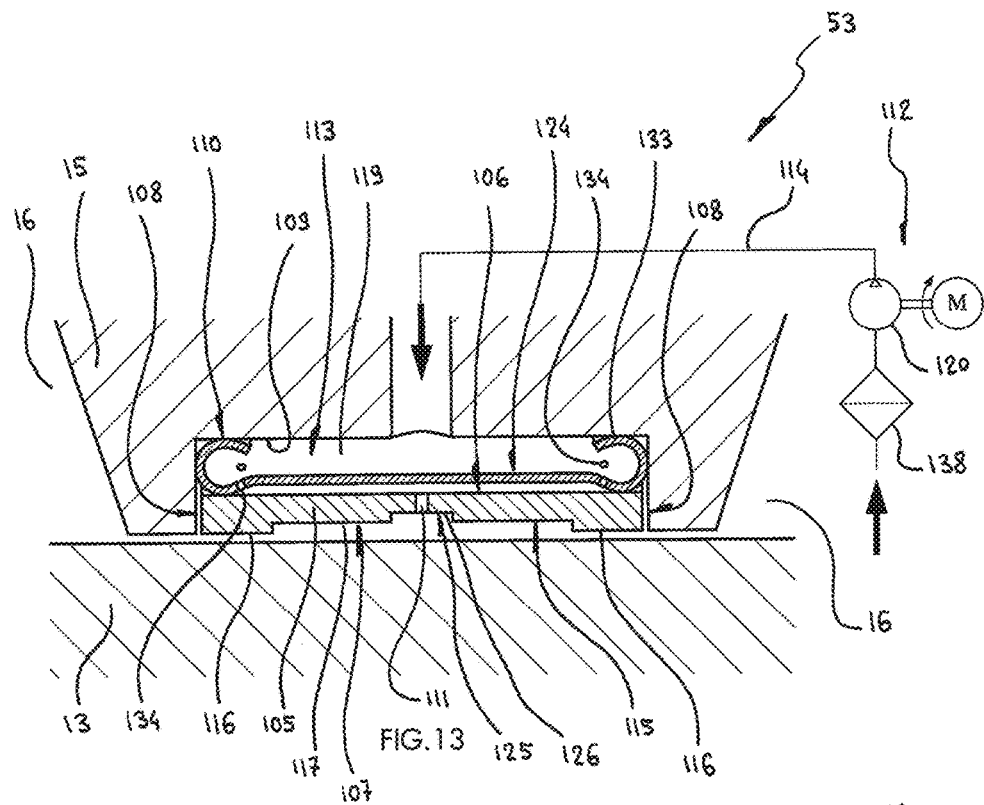
Figure 14:
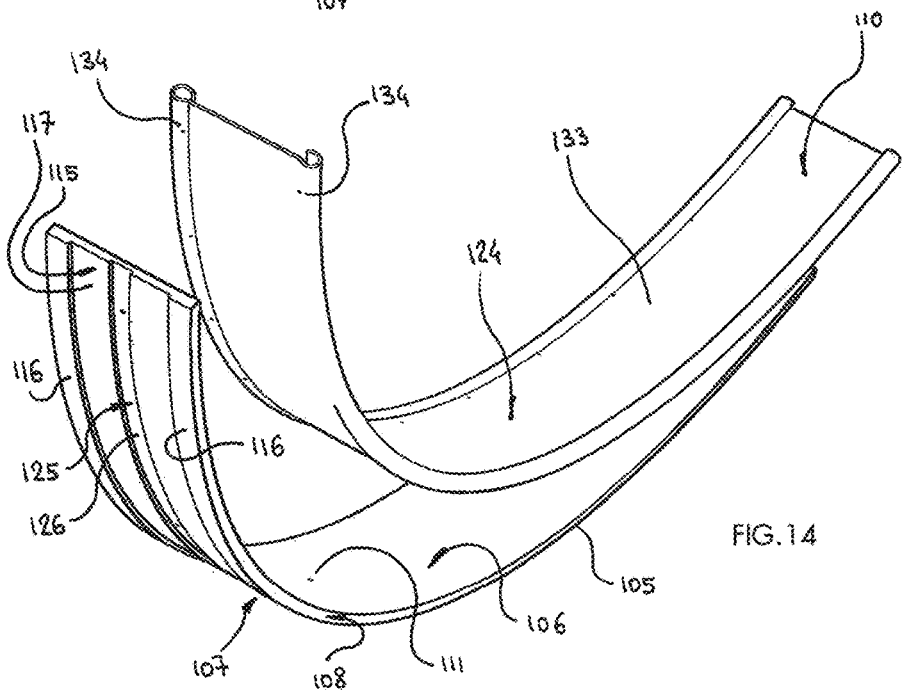

FIGS. 13 and 14 are respectively a schematic cross section and a three-dimensional exploded view of the piston sealing means of the heat engine with transfer-expansion and regeneration according to the invention particularly when they are composed of a continuous perforated ring, the annular groove housing an expansion spring which produces by contact a seal between the annular groove and the continuous perforated ring, said spring being moreover provided with fluid diffusion orifices in order to constitute means of diffusion of ring fluid.

Figure 15:
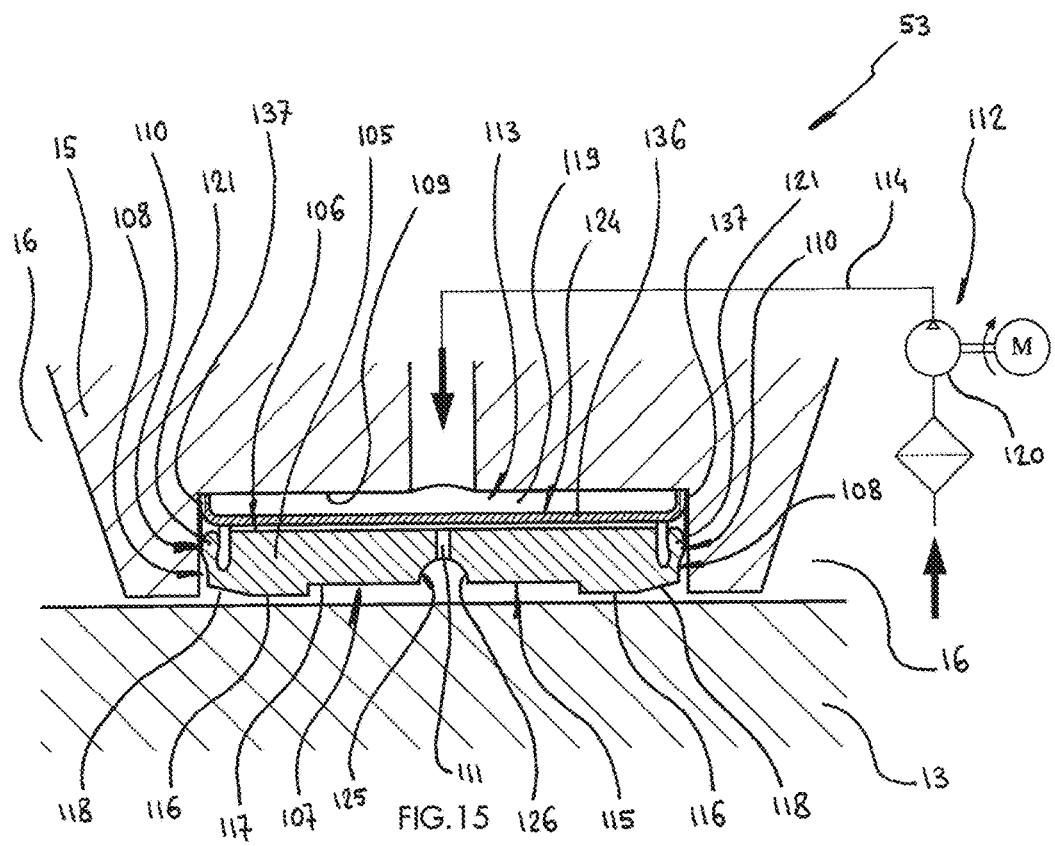
Figure 16:
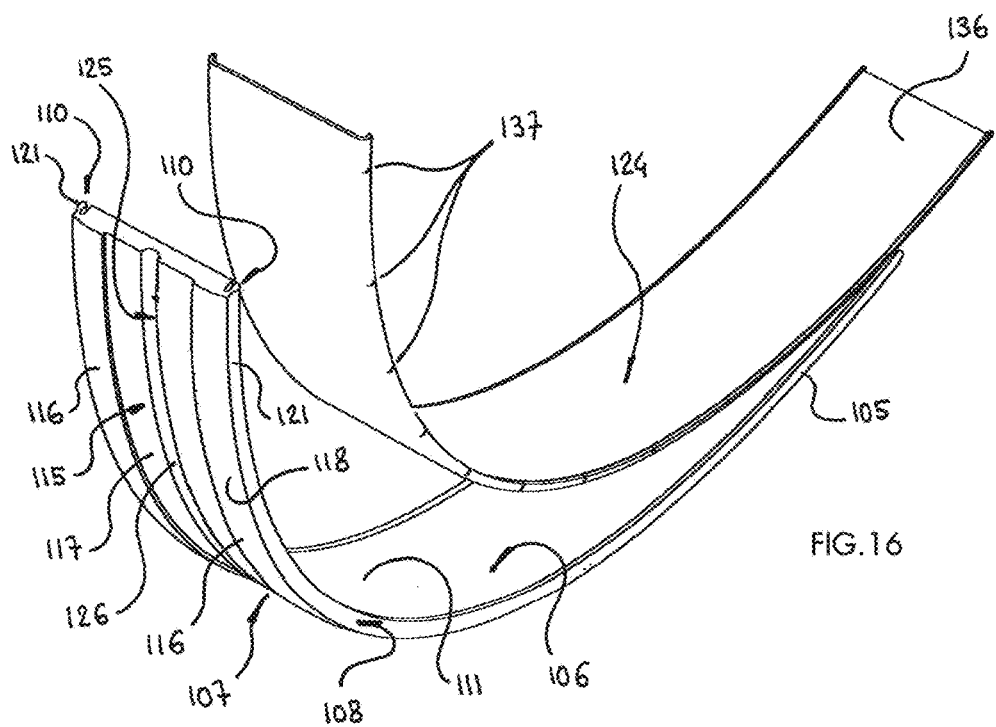

FIGS. 15 and 16 are respectively a schematic cross section and a three-dimensional exploded view of the piston sealing means of the heat engine with transfer-expansion and regeneration according to the invention particularly when they are composed of a continuous perforated ring, a diffusion plate provided with lateral grooves of the diffusion plate being lodged at the bottom of the annular groove, while a ring sealing lip integrated with the continuous perforated ring constitutes the ring sealing means, and the continuous perforated ring has clearances of the edge plating.

FIGS. 17 and 18 are respectively a schematic cross section and a three-dimensional exploded view of the piston sealing means of the heat engine with transfer-expansion and regeneration according to the invention particularly when they are composed of a continuous perforated ring, the annular groove housing an expansion spring provided with fluid diffusion orifices in order to constitute means of diffusion of ring fluid, while the ring sealing means are composed of thinned axial portions disposed near the axial ends of the continuous perforated ring.

FIGS. 19 and 20 are schematic sectional views illustrating the functioning of the piston sealing means of the heat engine with transfer-expansion and regeneration according to the invention particularly when they are composed of a continuous perforated ring, the ring sealing means being composed of an O-ring.

FIG. 21 is a schematic sectional view of the rod sealing means of the heat engine with transfer-expansion and regeneration according to the invention when they are applied to the pressure supply pipe and when they are composed in particular of an upper rod seal, a lower rod seal, an oil circulation chamber, and a rod guide collar.

FIG. 22 is a schematic sectional view of the rod sealing means of the heat engine with transfer-expansion and regeneration according to the invention when they are applied to the expansion piston rod and when they are composed in particular of an upper rod seal, a lower rod seal, an oil circulation chamber, and a segment spreading spring.

SPECIFICATION OF THE INVENTION

There is shown in FIGS. 1 to 22 the heat engine with transfer-expansion and regeneration 1, various details of its components, its variants, and its accessories.

Figure 1:
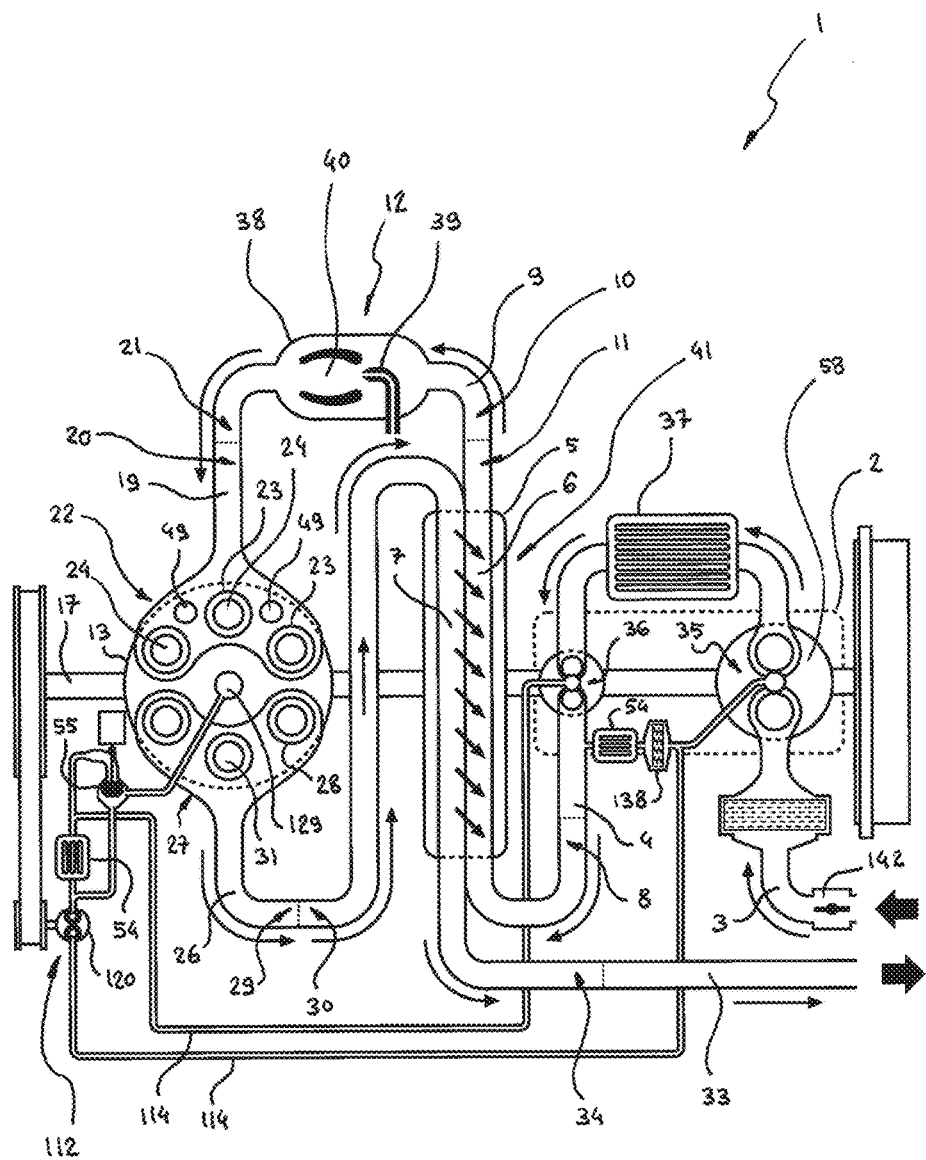
Figure 2:
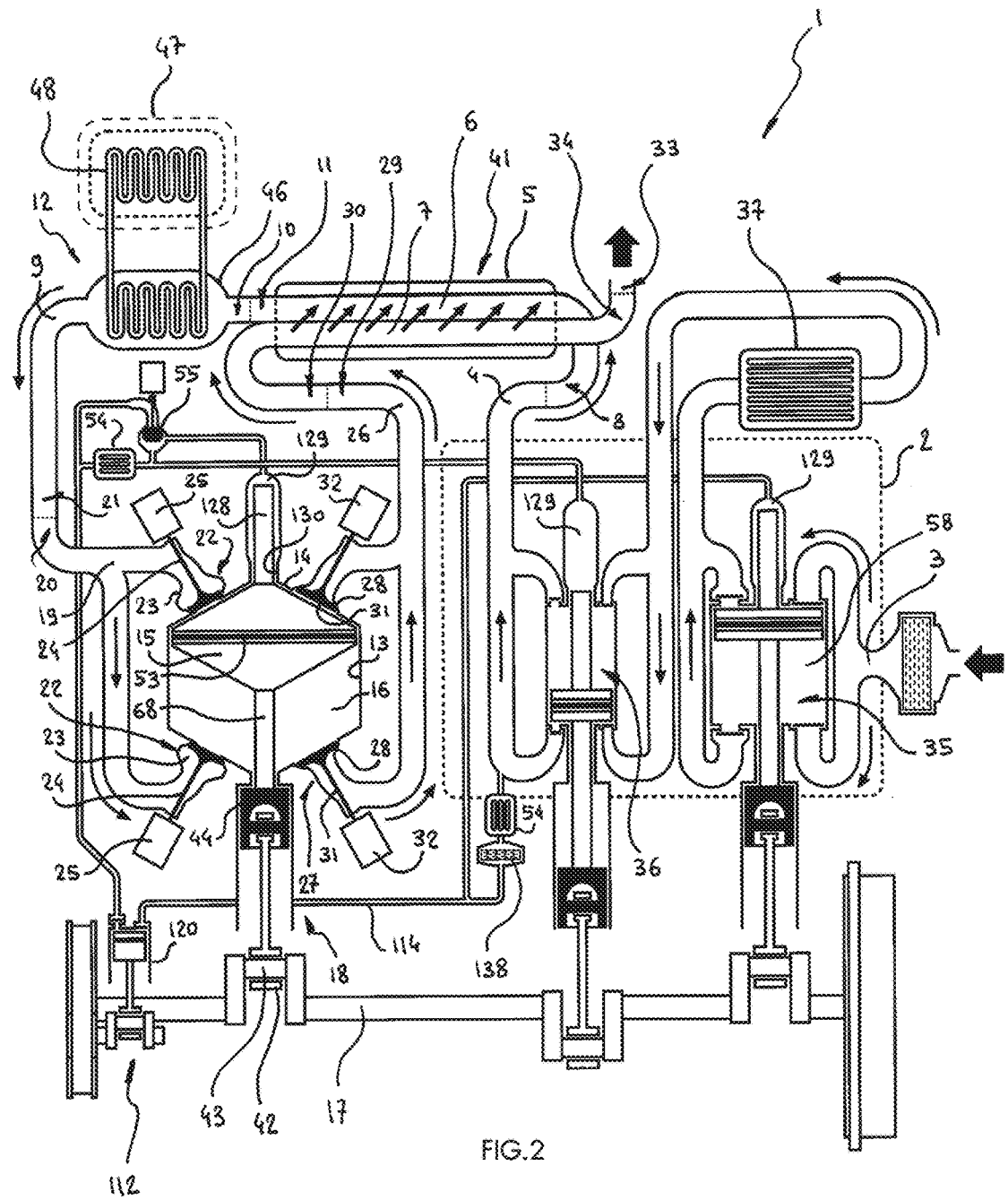
Figure 3:
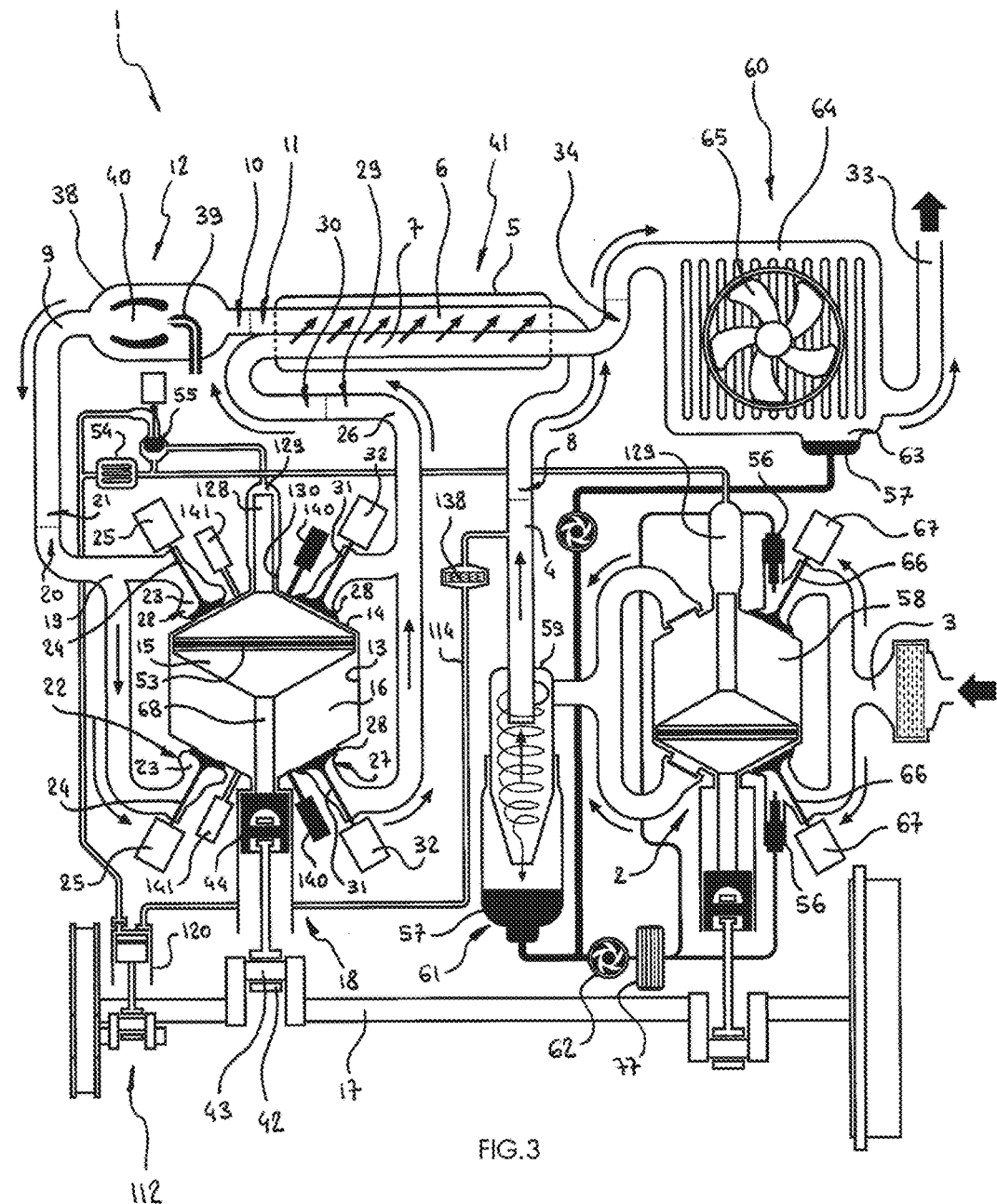

As is shown clearly by FIGS. 1 to 3, the heat engine with transfer-expansion and regeneration 1 comprises at least one compressor 2 able to aspirate gases at a certain pressure via a compressor inlet line 3 and drive them out at a greater pressure in a compressor outlet line 4, said compressor 2 being centrifugal, volumetric rotary blade, screw or lobe type, or volumetric reciprocating piston type, or any type known to the skilled person.

One notes that if the compressor 2 is an reciprocating piston type, its admission gate can be advantageously replaced by a compressor admission metering valve 66 whose opening and/or closing are controlled by a compressor admission metering valve actuator 67. According to this configuration, the quantity of air admitted by the compressor 2 can be regulated by said actuator 67 either during the admission cycle of said compressor 2, the closing of said metering valve 66 being more or less early, or during the compression cycle of said compressor 2, the closing of said metering valve 66 being more or less late.

One also sees in FIGS. 1 to 3 that the heat engine with transfer-expansion and regeneration 1 according to the invention comprises at least one regeneration heat exchanger 5 composed of at least one high-pressure regeneration line 6 and at least one low-pressure regeneration line 7, a first end 8 of said high-pressure line 6 being connected to the compressor outlet line 4, while the gases circulating in the low-pressure regeneration line 7 can give up a portion of their heat to the gases circulating in the high-pressure regeneration line 6. One further notes that the interior of the low-pressure regeneration line 7 can be lined with precious metals such as platinum, palladium or rhodium, whose catalytic properties favor the oxidation of hydrocarbons which may be contained in the gases circulating in said low-pressure line 7.

Said heat engine with transfer-expansion and regeneration 1 also comprises at least one high-pressure regenerator outlet line 9 having a first end 10 connected to a second end 11 of the high-pressure regeneration line 6.

One also notices in FIGS. 1 to 3 that the heat engine with transfer-expansion and regeneration 1 according to the invention comprises at least one heat source 12 placed in any given place of the high-pressure regenerator outlet line 9 and which can superheat the gases circulating in said line 9.

FIGS. 1 to 5 likewise show that the heat engine with transfer-expansion and regeneration 1 according to the invention comprises moreover at least one expansion cylinder 13, at least one end of which is closed by an expansion cylinder head 14 integrated with said cylinder 13 or attached to the latter, said cylinder 13 housing an expansion piston 15 with which it produces a seal to form a transfer-expansion chamber 16 of variable volume, said piston 15 being able to move in said cylinder 13 and being directly or indirectly connected to a power output shaft 17 by mechanical means of transmission 18 so as to impose on said shaft 17 a continuous rotation movement when said piston 15 performs reciprocating movements in the expansion cylinder 13.

As the case may be, the mechanical means of transmission 18 can be lodged in an engine crankcase 45 and can cooperate with electrical, pneumatic or hydraulic power transmission means which can be inserted between said mechanical means 18 and the expansion piston 15. For example, the expansion piston 15 can directly actuate the piston of a hydraulic pump to provide a flow of oil under pressure, which can be used by a hydraulic motor or any other hydraulic machine.

It will be noted that, as a variant illustrated in FIGS. 2 to 5, the expansion cylinder 13 can define with the expansion piston 15 two transfer-expansion chambers 16. According to this configuration, the two ends of the expansion cylinder 13 are closed by an expansion cylinder head 14, which is placed on the side with the mechanical means of transmission 18, being traversed by an orifice through which at least some of said means 18 pass, or accessory elements with which said means 18 interact. It will also be noted that the expansion cylinder 13, the expansion cylinder head 14 and the expansion piston 15 can be made of a material resistant to very high temperatures on the order of a thousand degrees Celsius or more, such as ceramics based on alumina, zircon, or silicon carbide.

Looking at FIGS. 1 to 3, one likewise notes that the heat engine with transfer-expansion and regeneration 1 according to the invention comprises at least one hot gas admission line 19 having a first end 20 connected to a second end 21 of the high-pressure regenerator outlet line 9, said admission line 19 comprising a second end 22 which passes through the expansion cylinder head 14 to empty into the expansion cylinder 13 via a mouth of the hot gas admission line 23.

FIGS. 1 to 5 show that the heat engine with transfer-expansion and regeneration 1 according to the invention also comprises at least one admission metering valve 24 operated by a metering valve actuator 25, said valve 24 being able to block or open the mouth of the hot gas admission line 23, while the metering valve actuator 25 can be controlled by a computer which controls the time of opening and/or closing of the admission metering valve 24 as a function of the relative position of the expansion piston 15 with respect to the expansion cylinder 13 and the direction of displacement of said piston 15, said computer also being able to control the lift height of said valve 24. It will be noted that the metering valve actuator 25 can be mechanical with a return spring or desmodromic, electrical, electromechanical, hydraulic, hydromechanical, pneumatic, hydropneumatic, or generally speaking any type known to the person skilled in the art.

In FIGS. 1 to 5 one likewise sees that the heat engine with transfer-expansion and regeneration 1 according to the invention also comprises at least one expanded gas exhaust line 26 which comprises a first end 27 that passes through the expansion cylinder head 14 to empty into the expansion cylinder 13 via a mouth of the expanded gas exhaust line 28, said exhaust line 26 also comprising a second end 29 connected to a first end 30 of the low-pressure regeneration line 7.

One will see in FIGS. 1 to 6 that the heat engine with transfer-expansion and regeneration 1 according to the invention comprises at least one exhaust valve 31 operated by an exhaust valve actuator 32, said valve 31 being able to block or open the mouth of the expanded gas exhaust line 28, however the exhaust valve actuator 32 can be controlled by a computer which controls the time of opening and/or closing of the exhaust valve 31 as a function of the relative position of the expansion piston 15 with respect to the expansion cylinder 13 and the direction of displacement of said piston 15, said computer also being able to control the lift height of said valve 31. It will be noted that the exhaust valve actuator 32 can be mechanical with a return spring or desmodromic, electrical, electromechanical, hydraulic, hydromechanical, pneumatic, hydropneumatic, or generally speaking any type known to the person skilled in the art.

It will be noted that depending on the embodiment chosen for the heat engine with transfer-expansion and regeneration 1 according to the invention, the admission metering valve 24 and/or the exhaust valve 31 can be solid or hollow. In the latter case, said valve 24, 31 may or may not contain a liquid or heat transfer salts. Said valve 24, 31 furthermore can be made from one or more pieces of steel of any grade and/or ceramic, with or without reinforcement. If said valve 24, 31 is hollow, it can be designed as light as possible, that is, have a steel thickness at the limits of the allowable for the rigidity and the longevity of said valve 24, 31.

Finally, as can be seen in FIGS. 1 to 3, the heat engine with transfer-expansion and regeneration 1 according to the invention comprises at least one engine outlet line 33 placed in the prolongation of a second end 34 of the low-pressure regeneration line 7, or combined with said second end 34 to make only a single piece with the latter.

It will be noted that if the heat engine with transfer-expansion and regeneration 1 according to the invention has at least one reciprocating piston type compressor 2, the expansion cylinder(s) 13 and said compressor 2 comprised by said engine 1 can be connected to the same power output shaft 17 and be arranged around the latter in line, in a "V", flat, star-shaped, or in any other architecture applicable to conventional reciprocating piston type engines or compressors, so as to optimize the footprint, the proportions or the vibration emissions of said heat engine with transfer-expansion and regeneration 1.

As is illustrated by FIGS. 1 and 2, the compressor 2 of the heat engine with transfer-expansion and regeneration 1 according to the invention can be two-stage and composed of a low-pressure compressor 35 whose outlet is connected to the inlet of a high-pressure compressor 36 via an intermediate compressor cooler 37, familiar in itself, which cools the gases leaving the low-pressure compressor 35 one by one, dissipating the heat into the atmosphere or any other colder environment than said gases and before they are admitted into the inlet of the high-pressure compressor 36. It will be noted here that if the low-pressure compressor 35 is of reciprocating piston type, its cylinder at least can be cooled by air or by water.

FIGS. 1 to 3 also show that the power output shaft 17—according to one particular embodiment of the heat engine with transfer-expansion and regeneration 1 according to the invention—can drive the compressor 2 in rotation. It is noted that this can be done directly or through a several-speed or continuously variable transmission.

As is shown by FIG. 3, the compressor inlet line 3 can have a water injector 56 which can spray liquid water 57 in the gases circulating in said line 3 before said gases are introduced in a suction-delivery chamber 58 defined by the compressor 2 which aspirates them, the water injector 56 being of any known type to the skilled person and being supplied with liquid water 57 by a water pump 62 or with any other liquid such as oil or other hydrocarbons by a liquid pump of any given type.

As another variant, it will be noted that the compressor 2 can define a suction-delivery chamber 58 into which empties a water injector 56, which latter can spray liquid water 57 in the gases introduced into said chamber 58 after said gases have been aspirated via the compressor inlet line 3 by said compressor 2. It will be noted that the water injector 56 can be of any known type to the skilled person and that it can be supplied with liquid water 57 by a water pump 62 or with any other liquid such as oil or other hydrocarbons by a liquid pump of any given type.

Insofar as a water injector 56 is provided, FIG. 3 shows that the compressor outlet line 4 can have an air/water separator 59 which recovers liquid water 57 present in the gases which have been delivered by the compressor 2 in said outlet line 4, and which stores said water 57 in a liquid water recovery tank 61. It will be noted that the air/water separator 59 can be, for example, of centrifugal or cyclonic type, or any other type known to the skilled person.

According to another variant of the heat engine with transfer-expansion and regeneration 1 according to the invention, again shown in FIG. 3, the engine outlet line 33 can have a condensation gas dryer 60 into which go the gases leaving the low-pressure regeneration line 7, said dryer 60 having internal walls maintained at relatively low temperature by any possible cold source so that when said gases sweep over said walls they cool them, a large portion of the vapor contained in said gases then being condensed to form liquid water 57 which trickles along said walls to be recovered in a condensate tank 63.

It will be noted that if the cold source is the ambient atmospheric air, the condensation gas dryer 60 can be composed primarily of an air/air condensation exchanger 64 integrating the condensate tank 63 or connected to the latter, while said ambient air can be forced to pass through said exchanger 64 by a condensation exchanger fan 65.

FIG. 3 also shows that the compressor 2 can have a compressor admission metering valve 66 whose opening and closing are controlled by a compressor admission metering valve actuator 67, said valve 66 opening to connect the compressor inlet line 3 to a suction-delivery chamber 58 defined by the compressor 2.

According to this particular configuration of the heat engine with transfer-expansion and regeneration 1 according to the invention, the compressor admission metering valve actuator 67 can regulate the quantity of air admitted by the compressor 2 either during the admission cycle of said compressor 2, the closing of said metering valve 66 being more or less early, or during the compression cycle of said compressor 2, the closing of said metering valve 66 being more or less late.

As a variant represented in FIGS. 1 to 3, the high-pressure regeneration line 6 and the low-pressure regeneration line 7 can be placed side by side for all or some of their length, the direction of circulation of the gases contained in the high-pressure regeneration line 6 being opposite the direction of circulation of the gases contained in the low-pressure regeneration line 7, the two said lines 6, 7 constituting a counterflow heat exchanger 41, familiar in itself, which can be composed of tubes, stacked plates, or any other arrangement known to the skilled person and applicable to this type of exchanger.

One also notes in FIGS. 1 and 3 that the heat source 12 can be a burner 38 composed of a fuel injector 39 and a combustion chamber 40, said fuel being liquid or gaseous and the combustion chamber being of any type known to the skilled person.

FIG. 2 shows a variant whereby the heat source 12 can be formed by a primary heat exchanger 46 which extracts heat from a universal heat source 47 to transfer said heat to the gases circulating in the high-pressure regenerator outlet line 9 directly or via a secondary heat transport circuit 48, the universal heat source 47 resulting—as a nonlimiting example—from the combustion of hydrocarbons of fossil or renewable origin, or the combustion of hydrogen, or a nuclear reaction.

It will be noted that the secondary heat transport circuit 48 can carry heat via a heat transfer agent of any nature, including melted salts or liquid metals. Advantageously, at least a portion of the primary heat exchanger 46 can be counterflow type.

It will be further noted that if the heat engine with transfer-expansion and regeneration 1 has a primary heat exchanger 46, it can operate in a closed circuit. In this case, the gases expelled by the engine outlet line 33 are cooled in an exchanger by which they surrender a large portion of their heat to a cold source of any given nature, before being aspirated again by the compressor 2. This configuration preferably intended for stationary applications avoids in particular any fouling of the regeneration heat exchanger so that it preserves the highest possible efficiency. This configuration also makes it possible to opt for non-oxidizing neutral and chemically stable gases such as nitrogen or carbon dioxide, or for gases whose physical characteristics are potentially more favorable than atmospheric air for the efficiency of the heat engine with transfer-expansion and regeneration 1 according to the invention.

FIG. 1 shows that the expansion cylinder head 14 can have a pressure balancing valve 49 which can block a line connecting the transfer-expansion chamber 16 and the hot bas admission line 19, said valve 49 being open if the pressure prevailing in the transfer-expansion chamber 16 is greater than that prevailing in the hot gas admission line 19 so that the gases pass from said chamber 16 to said line 19, said valve 49 being otherwise closed so that said gases cannot pass from said line 19 to said chamber 16 via said valve 49.

It will be noted in FIG. 3 that the transfer-expansion chamber 16 can comprise at least one temperature maintaining fuel injector 140 which can inject into said chamber 16 a liquid, gaseous or previously pulverized solid fuel, and this in order to temporarily raise the temperature of the hot gases admitted into said chamber 16 by the admission metering valve 24 at the moment of the admission of said gases into said chamber 16.

The result of this first strategy is an increasing of the efficiency of the heat engine with transfer-expansion and regeneration 1 according to the invention.

As an alternative or complement to said first strategy, the temperature maintaining fuel injector 140 can inject fuel into the transfer-expansion chamber 16 after the admission metering valve 24 has been closed to compensate for some or all of the drop in temperature of said gases during some or all of their expansion.

The result of this second strategy is that said gases approximately preserve their expansion starting temperature during some or all of their expansion, which increases the efficiency of the heat engine with transfer-expansion and regeneration 1.

Again in FIG. 3, one will note that the transfer-expansion chamber 16 can comprise at least one anti-NOx water injector 141 which can inject into said chamber 16 a refrigerant liquid—such as water—in order to maintain the maximum temperature of the hot gases contained in said chamber 16 this side of a certain threshold, especially during the re-compression of said gases at the end of the exhaust stroke.

This brief injection of refrigerant liquid makes it possible to reduce the quantity of pollutants and especially nitrogen oxides produced by the heat engine with transfer-expansion and regeneration 1 according to the invention.

One sees in FIGS. 2 to 5 that the expansion piston 15 can be connected to the mechanical means of transmission 18 by an expansion piston rod 68 which passes through the expansion cylinder head 14, a seal being produced between said rod 68 and said cylinder head 14 by rod sealing means 69 which can be comprised of at least a gasket, a segment, a ring or any other sealing means known to the skilled person.

FIG. 22 specifies that the rod sealing means 69 can comprise an upper rod seal 70 and a lower rod seal 71 sufficiently spaced apart to form—between the two said seals 70, 71—an oil circulation chamber 72 into which empties a cooling-lubrication oil supply line 73 and from which exits a cooling-lubrication oil outlet line 74.

Being so designed, the rod sealing means 69 allow the oil circulating between the cooling-lubrication oil supply line 73 and the cooling-lubrication oil outlet line 74 via the oil circulation chamber 72 to provide, on the one hand, lubrication between the expansion piston rod 68 and the two said seals 70, 71 and, on the other hand, cooling of the expansion piston rod 68.

One notes that the upper rod seal 70 and/or the lower rod seal 71 can be formed, in particular, from a cut segment or two superimposed cut segments and whose cuts are staggered in angle, while the external surface of the expansion piston rod 68 can be provided with scratches of slight depth in a double helix forming a succession of oil reservoirs and hydrodynamic floating surfaces.

In FIG. 22, one notes that the segments making up the upper rod seal 70 can be kept at a distance from those making up the lower rod seal 71 by a segment spreading spring 75 likewise designed—especially because it comprises orifices or passages—to let pass the cooling and lubricating oil flow organized between the cooling-lubrication oil supply line 73 and the cooling-lubrication oil outlet line 74.

It will be noted that—as illustrated in FIG. 21 the rod sealing means 69 can also be applied to the pressure supply pipe 128 so as to produce a seal between the latter and the expansion cylinder head 14 or the bore of the pressure chamber 130 through which said pipe 128 passes, as well as ensure the cooling of said pipe 128.

FIG. 21 shows that the rod sealing means 69 can cooperate with a rod guide collar 76 lodged inside or outside the oil circulation chamber 72, said collar 76 being made of bronze or any other material customarily used to make antifriction and/or hydrodynamic collars or bearings, and said collar 76 ensures the radial guidance of the expansion piston rod 68 in the expansion cylinder head 14.

One notes furthermore that the rod sealing means 69 are preferably provided with a rod guide collar 76 when they are applied to the pressure supply pipe 128, while the radial guidance of the expansion piston rod 68 can be indirectly provided by the crosshead 44.

In FIGS. 2 to 5, one notes that the mechanical means of transmission 18 of the heat engine with transfer-expansion and regeneration 1 according to the invention can be formed by a connecting rod 42, one end of which articulates directly or indirectly in the expansion piston 15 and its other end articulates around a crank 43 integrated with the power output shaft 17.

It will be noted that if the expansion cylinder 13 defines with the expansion piston 15 two transfer-expansion chambers 16, the connecting rod can articulate in the expansion piston 15 by means of a crosshead 44 integrated with said piston 15 and be guided in translation with respect to the engine crankcase 45. The crosshead 44 can then be a cylindrical guidance piston sliding in a guidance cylinder, or have any other shape cooperating with rails or guides disposed in or on the engine crankcase 45.

Figure 6:
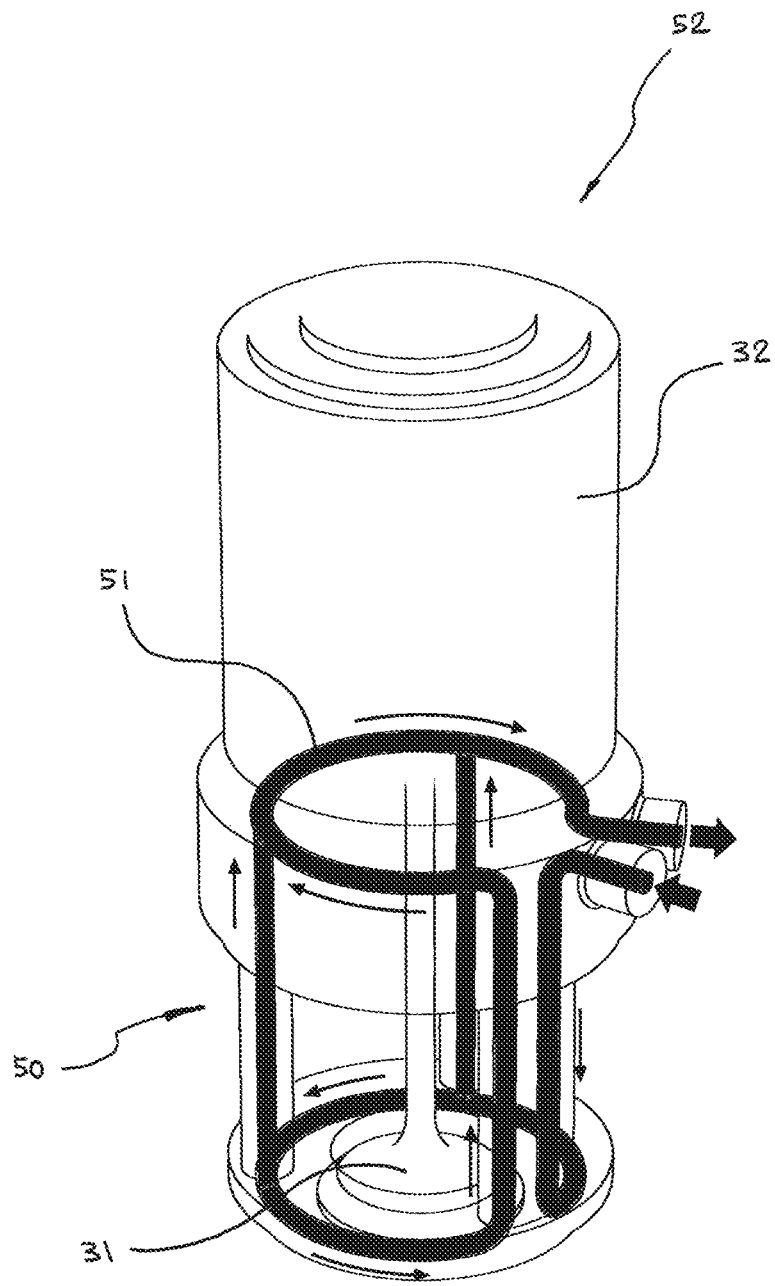
FIG. 6 is a three-dimensional see-through view of an exhaust valve of the heat engine with transfer-expansion and regeneration according to the invention whose seat and the portion of a valve cage which guides said valve are cooled by a valve cooling circuit.

FIG. 6 shows that the admission metering valve 24 and/or the exhaust valve 31 of the heat engine with transfer-expansion and regeneration 1 according to the invention can be guided directly or indirectly in a valve cage 50 lodged in the expansion cylinder head 14, said cage 50 having a seat on which said valve 24, 31 can rest to form a seal, while said seat and/or the part of the valve cage 50 which guides said valve 24, 31 is cooled by a valve cooling circuit 51 in which a heat transfer agent circulates. It will be noted in FIG. 6 that said valve 24, 31, the valve cage 50 and the metering valve actuator 25 or the exhaust valve actuator 32 can constitute a ready-made cartridge 52 which is installed in the expansion cylinder head 14.

FIG. 5 and FIGS. 11 to 20 show that in general the expansion piston 15 of the heat engine with transfer-expansion and regeneration 1 according to the invention can have piston sealing means 53 which produce the most perfect possible seal between said piston 15 and the expansion cylinder 13 and which can be composed of at least one cut segment and/or a sealing ring, regardless of the material and the geometry of said segment and/or said ring.

More particularly, FIG. 5 and FIGS. 11 to 20 shows that the piston sealing means 53 of the heat engine with transfer-expansion and regeneration 1 according to the invention can comprise at least one continuous perforated ring 105 having an internal cylindrical ring surface 106, an external cylindrical ring surface 107 and two axial ring surfaces 108, said ring 105 being lodged in at least one annular groove 109 disposed in the expansion piston 15, while said ring 105 can move radially in the annular groove 109 without being able to exit from it. One will further note that the annular groove 109 can maintain directly or indirectly the continuous perforated ring 105 which is axially integrated with the expansion piston 15.

In this case, the piston sealing means 53 of the heat engine with transfer-expansion and regeneration 1 according to the invention have ring sealing means 110 which provide a seal between each axial surface of the ring 108 and the annular groove 109, such that the latter defines with the continuous perforated ring 105 a pressure distribution chamber 119. It will be noted that the ring sealing means 110 can be comprised of an O-ring 132, a lip seal, a composite seal, or any known sealing segment or gasket regardless of its material or geometry. It should also be noted that the internal cylindrical ring surface 106 or the external cylindrical ring surface 107 facing the annular groove 109 can have a non-cylindrical surface of revolution such that every variation in thickness of the continuous perforated ring 105 is possible over its axial length, said ring 105 being either a simple circular sheet deformed by burnishing or stamping, or a piece made by rolling, by any given cutting or straightening tool or by any other electrochemical or other fabrication method known to the skilled person.

Figure 5:
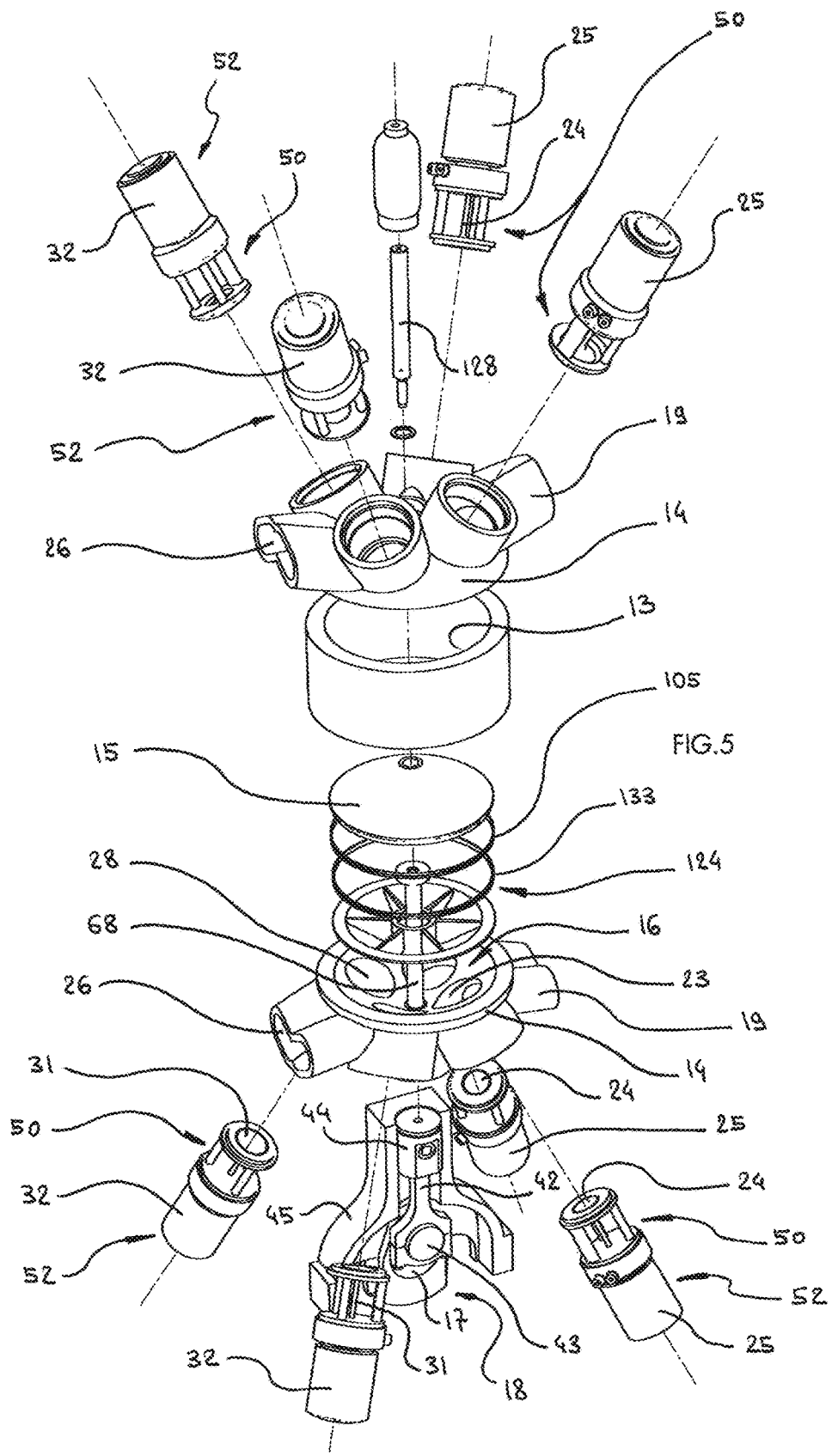

Again in the configuration of the piston sealing means 53 of the heat engine with transfer-expansion and regeneration 1 according to the invention shown in FIG. 5 and in FIGS. 11 to 20 and based on at least one continuous perforated ring 105, at least one calibrated orifice 111 passes entirely through the continuous perforated ring 105 in its radial thickness, the first end of said orifice 111 emerging onto the internal cylindrical ring surface 106 while the second end of said orifice 111 emerges onto the external cylindrical ring surface 107.

Said piston sealing means 53 also comprise at least one source of pressurized fluid 112 from which a pressurized ring fluid 113 emerges, the outlet of said fluid source 112 being connected to the pressure distribution chamber 119 by a pressure transfer circuit 114 such that the ring fluid 113 exerts a pressure on the internal cylindrical ring surface 106. It will be noted that the pressure to which the ring fluid 113 is subjected is always greater than that prevailing in the transfer-expansion chamber 16. As a consequence of the foregoing, the diameter of the continuous perforated ring 105 increases under the effect of the pressure of the ring fluid 113 due to the elasticity of said ring 105, so that the external cylindrical ring surface 107 tends to come closer to the expansion cylinder 13.

It will also be noted that the diameter of the calibrated orifice 111 is calculated so that, taking into account the flow rate of ring fluid 113 coming from the pressurized fluid source 112, the pressure exerted by said ring fluid 113 on the internal cylindrical ring surface 106 always remains greater than that prevailing in the transfer-expansion chamber 16. It will be noted that the pressurized fluid source 112 can be a pneumatic fluid compressor 120 of piston, vane, screw, centrifugal, or any type known to the skilled person or any type familiar in itself. The compressor of pneumatic fluid 120 can cooperate with a familiar pressure accumulator or not. It will be noted that a small-mesh ring fluid filter 138 can be installed upstream or downstream of the pneumatic fluid compressor 120 so as to remove from the ring fluid 113 any particle greater than a certain size before said fluid 113 is introduced into the pressure distribution chamber 119.

The piston sealing means 53 of the heat engine with transfer-expansion and regeneration 1 according to the invention as shown in FIG. 5 and in FIGS. 11 to 20 being based on at least one continuous perforated ring 105, said means 53 comprise at least one counterpressure cavity 115 which is axially blind and hollowed out from the external cylindrical ring surface 107, the calibrated orifice 111 emptying into said counterpressure cavity 115, while the surface of the external cylindrical ring surface 107 not occupied by said cavity 115 constitutes an air cushion floating surface 116.

It will be noted that the extent of the counterpressure cavity 115 can be of any given dimension from the smallest, that is, equivalent to a non-zero radius of the outlet of the calibrated orifice 111, to the largest, that is, just substantially less than that of the external cylindrical ring surface 107 which receives said cavity 115. It is specified that the expansion piston 15 can have in the vicinity of the annular groove 109 a decompression groove or slots or any other internal channel or surface of any type connecting said vicinity to the transfer-expansion chamber 16.

FIGS. 11 to 20 show that the piston sealing means 53 of the heat engine with transfer-expansion and regeneration 1 according to the invention can be provided with the counterpressure cavity 115 which is comprised of a counterpressure groove 117 of slight depth, more or less centered on the axial length of the external cylindrical ring surface 107, said counterpressure groove 117 being made over the entire circumference of said external cylindrical ring surface 107, each annular surface bordering on said counterpressure groove 117 constituting an air cushion floating surface 116.

In FIGS. 13 to 20, one sees that the calibrated orifice 111 can emerge into the counterpressure cavity 115 by means of a pressure distribution cavity 125 hollowed out from the bottom of said counterpressure cavity 115.

In the same FIGS. 13 to 20, one notes that the pressure distribution cavity 125 can be comprised of a pressure distribution groove 126 more or less centered on the axial length of the external cylindrical ring surface 107, said pressure distribution groove 126 being made over the entire circumference of said external cylindrical ring surface 107.

FIGS. 15 and 16 show that at least one of the two axial rims of the external cylindrical ring surface 107 or the internal cylindrical ring surface 106 receiving the counterpressure cavity 115 can terminate in a clearance of edge plating 118 which allows the pressure of the ring fluid 113 contained in the pressure distribution chamber 119 to exert a locally more elevated force on the air cushion floating surface 116 adjoining said clearance of the edge plating 118.

In FIGS. 15 and 16, one also sees that the ring sealing means 110 can be made from an annular sealing lip 121 which is integrated with the continuous perforated ring 105 on the one hand, and which establishes a tight contact with the inside or the flange of the annular groove 109 on the other hand, said sealing lip 121 being mounted and attached to the continuous perforated ring 105 or being made from the same piece of material as said ring 105. Alternatively, the annular sealing lip 121 can be integrated with the annular groove 109 on the one hand and establish a tight contact with the continuous perforated ring 105 on the other hand. In this case, said lip 121 can be either mounted and attached in the annular groove 109 or on the flange of the latter, or be made of the same piece of material as said groove 109.

As a variant of the piston sealing means 53 of the heat engine with transfer-expansion and regeneration 1 according to the invention shown in FIGS. 17 and 18, the ring sealing means 110 can be comprised of a thinner axial portion 139 disposed in the vicinity of at least one of the axial ends of the continuous perforated ring 105, said portion 139 being integrated with the annular groove 109 in tight manner, and being sufficiently flexible to allow the diameter of the continuous perforated ring 105 to increase or decrease in relation to that of said groove 109. It will be noted that the thinner axial portion 139 is designed so that the material of which it is composed has no risk of yielding either to the pressure of the ring fluid 113 or a repeated force which is incompatible with the fatigue strength limits of said material.

FIG. 12 on the other hand shows that the continuous perforated ring 105 can be composed of a flexible material and will comprise at least one circumferential annular spring 123 which tends to reduce the diameter of said ring 105. It will be noted that said flexible material can be an elastomer or a polymer, whether or not ballasted with anti-abrasive or antifriction particles, while the circumferential annular spring 123 can be incorporated in said material or maintained on the surface of the latter by means of a groove, a seat, or end stops. The circumferential annular spring 123 can be helicoidal like valve stem sealing gaskets, a split ring, or any other type allowing it to fulfill the desired function.

The variants illustrated in FIGS. 13 to 18 of the piston sealing means 53 of the heat engine with transfer-expansion and regeneration 1 according to the invention show that the pressure distribution chamber 119 can house means of diffusion of ring fluid 124 which force the ring fluid 113 coming from the pressure transfer circuit 114 to sweep over the largest possible surface of the internal cylindrical ring surface 106 before leaving via the calibrated orifice 111. This arrangement allows the ring fluid 113 to cool the continuous perforated ring 105 with the latter giving up a portion of its heat to said fluid 113.

As is shown by FIGS. 15 and 16, the means of diffusion of ring fluid 124 can be composed of a diffusion plate 136 lodged at the bottom of the annular groove 106, at least one of the axial ends of said plate 136 being provided with at least one orifice or lateral groove 137 of the diffusion plate, which forces the ring fluid 113 coming from the pressure transfer circuit 114 to empty into the pressure distribution chamber 119 by the at least one of its axial ends.

FIG. 12 shows that the annular groove 109 can have a radial annular end stop 127 which limits the penetration of the continuous perforated ring 105 into said groove 109, said end stop 127 being, but not limited to, a cylindrical surface constituting the bottom of the annular groove 109, or at least one circular ridge or studs arranged on the bottom of said groove 109, or at least one chamfer or flange disposed on at least one of the two sides of said groove 109.

Figure 4:
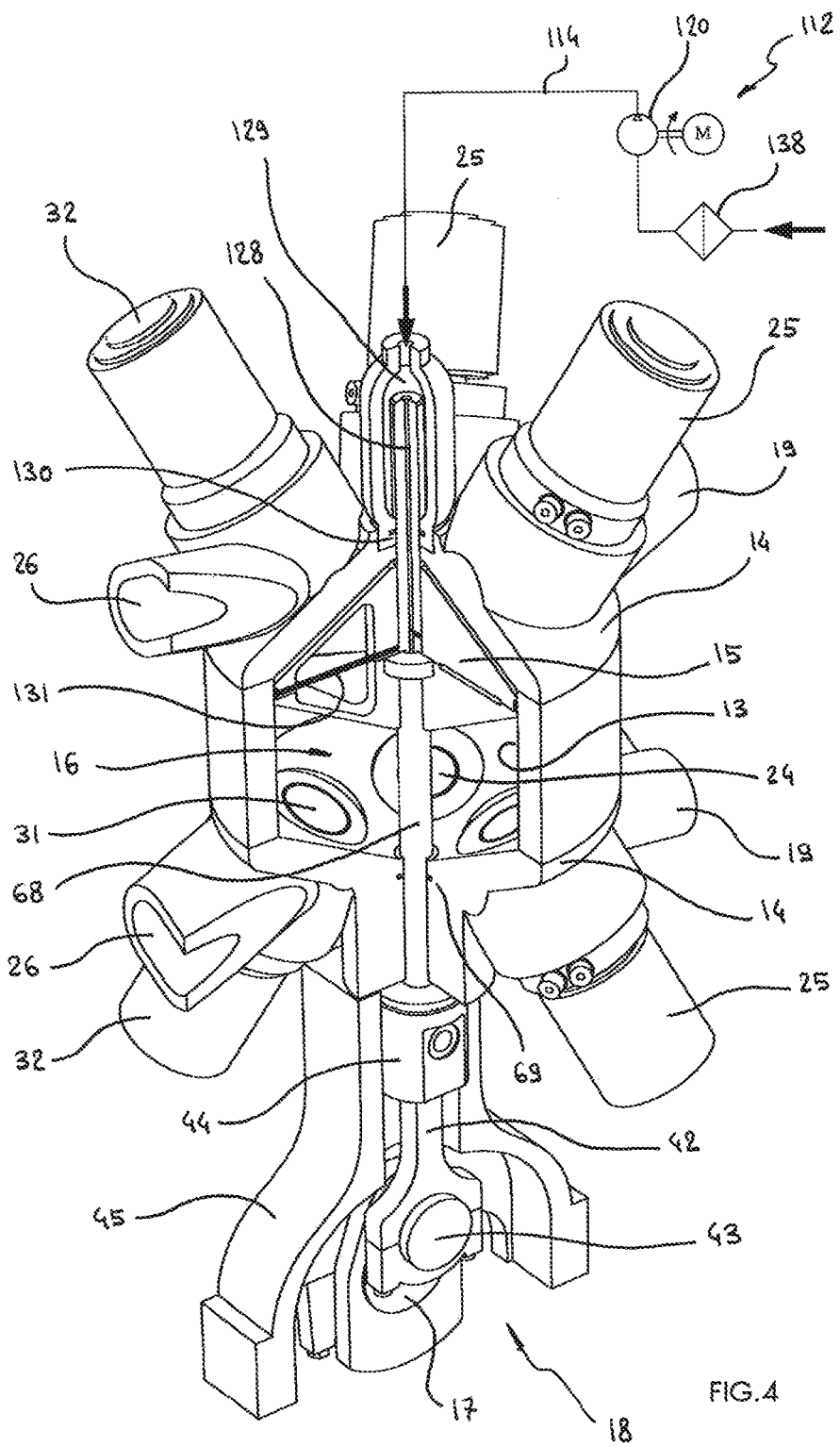

One sees in FIGS. 4 and 5 that the pressure transfer circuit 114 can be composed of a pressure supply pipe 128 in parallel with the expansion cylinder 13 and integrated with the expansion piston 15, a first end of said pipe 128 emptying inside said piston 15, while the second end of said pipe 128 empties, via a pressure chamber bore 130 in which it can move longitudinally and in tight manner, into a pressure chamber 129 connected to the pressurized fluid source 112.

It will be noted that the second end of the pressure supply pipe 128 which is moved in translation in the pressure chamber bore 130 can comprise a seal which slides in said bore 130 to produce a seal. Alternatively, the pressure chamber bore 130 can comprise a seal which slides around said second end of the pressure supply pipe 128 to provide a seal.

However, it will be noted that, like the expansion piston rod 68 which passes through the expansion cylinder head 14, a pipe seal—like that shown in FIG. 21—can be produced between the pressure supply pipe 128 and the pressure chamber bore 130 which comprises an upper rod seal 70 and a lower rod seal 71 sufficiently distant from each other to form—between said two seals 70, 71—an oil circulation chamber 72 into which empties a cooling-lubrication oil supply line 73 and from which departs a cooling-lubrication oil outlet line 74.

The pipe seal thus produced allows the oil circulating between the cooling-lubrication oil supply line 73 and the cooling-lubrication oil outlet line 74 via the oil circulation chamber 72 to ensure on the one hand the lubrication between the pressure supply pipe 128 and the said two seals 70, 71 and on the other hand the cooling of the pressure supply pipe 128.

In FIG. 4, one sees that the pressure supply pipe 128 can be connected to the pressure distribution chamber 119 by at least one radial pressure inlet line 131 which can be realized in the body of the expansion piston 15 or which can be attached to the latter, for example, by an assembly of pipes with or without sealing and/or expansion gaskets.

It will be noted that the pressure chamber 129 can be connected to the pressurized fluid source 112 via a proportional pressure check valve which allows the ring fluid 113 to go from said source 112 to said chamber 129, but not from said chamber 129 to said source 112. This particular feature makes it possible to use the variation in volume of the pressure chamber 129 produced by the back and forth movements of the second end of the pressure supply pipe 128 to increase the pressure prevailing in the pressure distribution chamber 119 when the expansion piston 151 is in the vicinity of its top dead center.

FIGS. 13, 14, 17 and 18 show that the annular groove 109 can house an expansion spring 133 which bears against said groove 109 to exert a radial force on the internal cylindrical ring surface 106, said spring 133 being helical, leaf, undulating, or any type known to the skilled person.

In FIGS. 13 and 14, one sees that the expansion spring 133 can produce by contact a tightness between the annular groove 109 and the continuous perforated ring 105.

FIGS. 13, 14, 17 and 18 furthermore show that the expansion spring 133 can be provided with at least one fluid diffusion orifice 134 and/or at least one fluid diffusion groove 135 so as to constitute, with said orifice 134 and/or said groove 135, the means of diffusion of ring fluid 124.

Functioning of the Invention

The functioning of the heat engine with transfer-expansion and regeneration 1 according to the invention is easily understood by looking at FIGS. 1 to 22. To provide the details of this functioning, we shall use here the sample embodiment of the heat engine with transfer-expansion and regeneration according to the invention as is illustrated schematically in FIGS. 1 and 2. Said sample embodiment calls for a two-stage piston type compressor comprised of a low-pressure compressor 35 and a high-pressure compressor 36, the outlet of the low-pressure compressor being connected to the inlet of the high-pressure compressor via an intermediate compressor cooling 37. FIGS. 1 and 2 being distinguished from one another primarily by the heat source 12, to explain the functioning of the present invention we shall use the heat source 12 shown in FIG. 1, which calls for a burner 38 whose fuel injector 39 feeds a combustion chamber 40.

According to the sample embodiment of the heat engine with transfer-expansion and regeneration 1 according to the invention as shown in FIGS. 1 and 2, the low-pressure compressor 35 and the high-pressure compressor 36 are driven by the same power output shaft 17 which takes the form of a crank shaft, while the mechanical means of transmission 18 between the expansion piston 15 and said shaft 17 are comprised of a connecting rod 42 one end of which is articulated in the expansion piston 15 by means of a crosshead 44 integrated with said piston 15 and whose other end is articulated about a crank 43 integrated with the power output shaft 17.

It will be noted that the low-pressure compressor 35 and the high-pressure compressor 36 are connected to the power output shaft 17 by similar means.

It will also be noticed in FIG. 2 that the admission metering valve 24 opens the mouth of the hot gas admission line 23, which it blocks by moving away from the expansion cylinder 13, while the exhaust valve 31 opens the mouth of the expanded gas exhaust line 28, which it blocks by moving closer to said cylinder 13, the seats of said valves 24, 31 being oriented respectively to the outside and to the inside of said cylinder 13.

The explanation of the functioning of the heat engine with transfer-expansion and regeneration 1 according to the invention shall also make reference to FIGS. 4 and 5 which show in three dimensions the expansion cylinder 13 and the different elements it interacts with, said cylinder 13 being shown schematically in FIGS. 1 and 2.

This being said, the heat engine with transfer-expansion and regeneration 1 according to the invention functions—in a nonlimiting sample embodiment—in the following manner once started and once its functioning is stabilized: the low-pressure compressor 35 takes in atmospheric air via the compressor inlet line 3. The temperature and the pressure of said air being respectively twenty degrees Celsius and one bar absolute pressure. The low-pressure compressor 35 then delivers said air at a pressure of ten bars and a temperature on the order of two hundred ninety degrees Celsius. Before reaching the inlet of the high-pressure compressor 36, said air is cooled in the intermediate compressor cooling 37 so that the temperature of said air again drops to the vicinity of twenty degrees Celsius, its pressure remaining unchanged at ten bars. This intermediate cooling improves the volumetric efficiency of the high-pressure compressor 36 and diminishes the working drawdown of said compressor 36 on the power output shaft 17.

The high-pressure compressor 36 which receives said air takes it in and supercharges it, delivering it to the compressor outlet line 4 at a pressure of twenty bars and a temperature on the order of eighty five degrees Celsius.

The air is then routed by the compressor outlet line 4 into the high-pressure regeneration line 6 where it receives the heat of the low-pressure regeneration line 7. The heat transfer between the low-pressure regeneration line 7 and the high-pressure regeneration line 6 occurs in the regeneration heat exchanger 5, which in this case is a counterflow heat exchanger 41 whose efficiency is particularly high.

The gases leave the high-pressure regeneration line 6, still at twenty bars but with a temperature close to three hundred degrees Celsius, whereas the gases leaving the low-pressure regeneration line 7 have been brought up to a pressure of one bar and a temperature on the order of ninety degrees Celsius.

Once exiting from the high-pressure regeneration line 6, the gases at three hundred degrees Celsius enter the high-pressure regeneration outlet line 9 and then go to the combustion chamber 40 of the burner 38 where their temperature is raised to eleven hundred degrees Celsius subsequent to the burning of the fuel injected into said chamber 40 by the fuel injector 39. The pressure of these gases is still twenty bars.

The gases then leave the high-pressure regeneration outlet line 9 and go to the hot gas admission line 19 which will take them up to the expansion cylinder 13, where they will be admitted now at a temperature of eleven hundred degrees Celsius and still at a pressure of twenty bars.

At this stage in the explanation of the functioning of the heat engine with transfer-expansion and regeneration 1 according to the invention, we shall only describe what occurs in the transfer-expansion chamber 16 located above the expansion piston 15 as represented in FIG. 2 and in FIGS. 4 and 5, being aware that the transfer-expansion chamber 16 situated below said piston 15 functions in exactly the same manner.

The expansion piston 15 being at the bottom dead center, it rises toward its top dead center, expelling into the expanded gas exhaust line 26 the hot gases which it has previously expanded from twenty bars and eleven hundred degrees Celsius to one bar and three hundred ten degrees Celsius.

When the expansion piston 15 arrives near its top dead center, the exhaust valve 31 closes and captures a certain quantity of residual exhaust gas in the transfer-expansion chamber 16. The moment of the closing of said valve 31 is designed so that the pressure and the temperature of said gases will rise respectively to twenty bars and eleven hundred degrees Celsius when the expansion piston 15 reaches its top dead center. Thus, this moment depends primarily on the dead volume remaining above the expansion piston 15 when it has reached said top dead center.

Thus, when the expansion piston 15 reaches its top dead center, the pressure and the temperature of the gases captured in the transfer-expansion chamber 16 are identical to those of the gases contained in the hot gas admission line 19. It is at this precise moment that the admission metering valve 24 opens and makes a connection between said line 19 and said chamber 16. To prevent any overpressure in the transfer-expansion chamber 16 due to an imperfect synchronization of the admission metering valve 24, the expansion cylinder head 14 of the heat engine with transfer-expansion and regeneration 1 according to the invention can, per the variant shown FIG. 1, have a pressure equalizing valve 49 which opens once the pressure prevailing in the transfer-expansion chamber 16 is greater than that prevailing in the hot gas admission line 19.

The expansion piston 15 being at the top dead center, the admission metering valve 24 being open and the pressure and the temperature of the gases being identical on either side of the mouth of the hot gas admission line 23, the expansion piston 15 begins its descent toward its bottom dead center.

In doing so, the gases at eleven hundred degrees Celsius and twenty bars contained in the hot gas admission line 19 enter into the transfer-expansion chamber 16, while the expansion piston 15 produces a first work on the power output shaft 17. When a certain quantity of said gases have been transferred into the transfer-expansion chamber 16, the admission metering valve 24 closes and the expansion of said gases begins, so that the expansion piston 15 produces a second work on the power output shaft 17. Said certain quantity is provided so that when the expansion piston 15 arrives at its bottom dead center, the pressure of said gases is substantially equivalent to atmospheric pressure of one bar absolute, while the temperature of said gases is on the order of three hundred ten degrees Celsius.

Once the expansion piston 15 has arrived at the bottom dead center, it again rises toward its top dead center, expelling the hot gases through the mouth of the expanded gas exhaust line 28, said gases having been previously expanded by said piston 15 from twenty bars and eleven hundred degrees Celsius to one bar and three hundred ten degrees Celsius. This marks the start of a new cycle.

Figure 7:
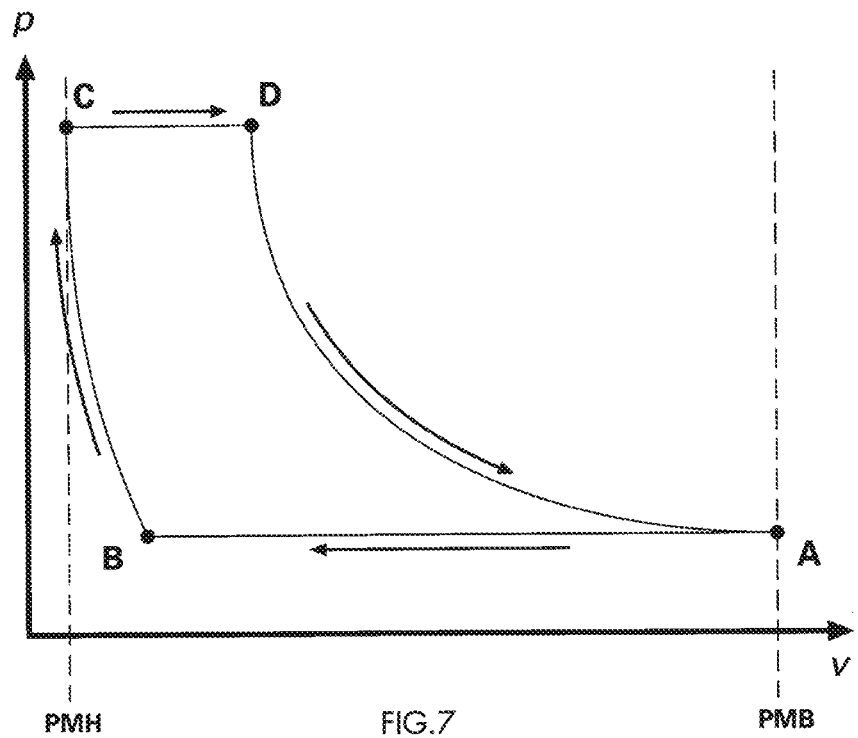
FIG. 7 is a pressure/volume diagram showing in schematic manner the cycle taking place in the transfer-expansion chamber of the heat engine with transfer-expansion and regeneration according to the invention.

The pressure/volume diagram of FIG. 7 illustrates the course of the cycle occurring in the transfer-expansion chamber 16. One notes in said FIG. 7 that—as is the case with regard to FIGS. 8, 9 and 10—the bottom dead center of the expansion piston 15 is noted as "PMB", while the top dead center of said piston 15 is noted as "PMH".

According to the example used in FIG. 7 to explain the functioning of the heat engine with transfer-expansion and regeneration 1 according to the invention, the stroke AB produced by the expansion piston 15 occurs when the pressure of the gases contained in the transfer-expansion chamber 16 is one bar and the temperature of said gases is three hundred ten degrees Celsius.

During stroke BC, the expansion piston 15 compresses the residual exhaust gases captured in the transfer-expansion chamber 16 by the exhaust valve 31 so that the pressure and the temperature of said gases changes respectively to twenty bars and eleven hundred degrees Celsius.

Stroke CD corresponds to the transfer to the transfer-expansion chamber 16 of the gases at eleven hundred degrees Celsius and twenty bars that are contained in the hot gas admission line 19, while the expansion piston 15 produces a first work on the power output shaft 17.

Stroke DA in turn corresponds to the expansion of the gases previously transferred to the transfer-expansion chamber 16 and whose quantity is regulated by the admission metering valve 24 such that when the expansion piston 15 arrives at its bottom dead center the pressure of said gases is substantially equivalent to atmospheric pressure of one bar absolute. The expansion of said gases allows the expansion piston 15 to produce a second work on the power output shaft 17.

Figure 8:
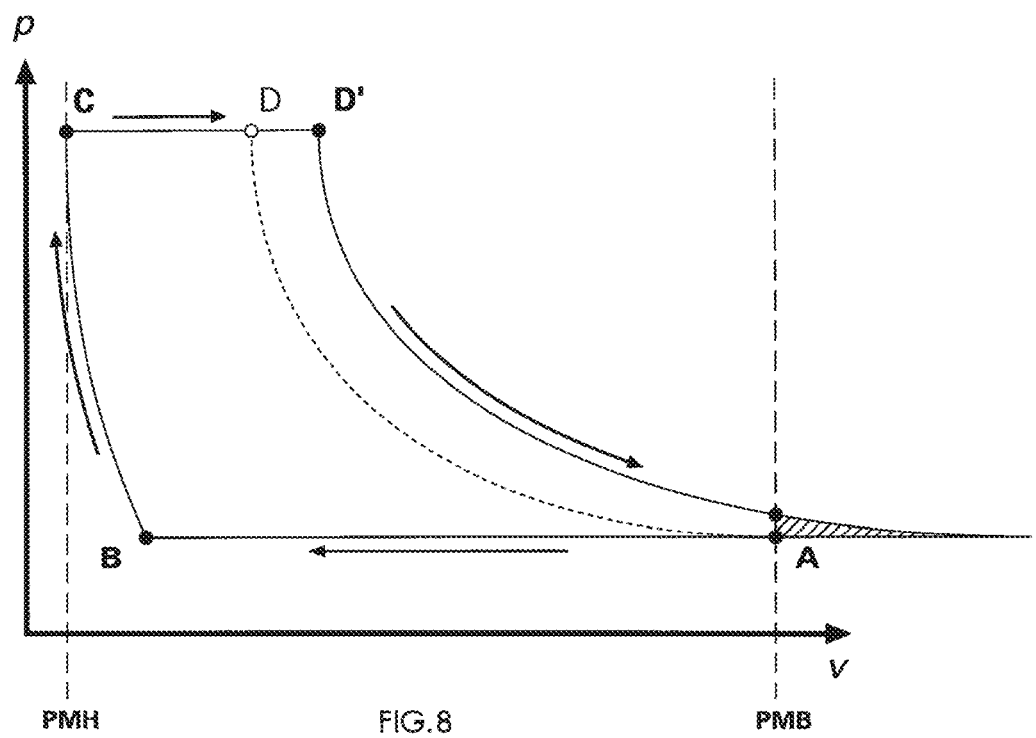
FIG. 8 is a pressure/volume diagram showing in schematic manner the cycle which can take place in the transfer-expansion chamber of the heat engine with transfer-expansion and regeneration according to the invention in order to maximize the torque of said engine.

The pressure/volume diagram of FIG. 8 in turn illustrates a different control strategy of the admission metering valve 24, said strategy being provided to maximize the specific torque of the heat engine with transfer-expansion and regeneration 1 according to the invention and thus to maximize the specific power of said engine 1 at constant speed.

In the diagram shown in FIG. 8, one notes that as compared to the diagram of FIG. 7 the moment of the closing "D" of the admission metering valve 24 has been delayed to the point marked "D'". Thus, more gases at eleven hundred degrees Celsius and twenty bars are transferred from the hot gas admission line 19 to the transfer-expansion chamber 16.

This surplus of gas being admitted, the stroke D'A of the expansion piston 15 becomes inadequate to expand said gases to one bar absolute. Consequently, when the exhaust valve 31 opens, the pressure of the gases is still, for example, three bars, while their temperature is still five hundred twenty degrees Celsius. On the other hand, the work area of the gases is significantly increased, albeit at the price of a substantial decrease in efficiency of the heat engine with transfer-expansion and regeneration 1 according to the invention.

One will note in FIG. 8 that the strokes AB and BC remain unchanged as compared to those corresponding ones shown in FIG. 7.

One also notes that, upon the opening of the exhaust valve 31, the excess temperature of the gases resulting from the truncation of the expansion as provided in FIG. 8 is primarily recycled by the regeneration heat exchanger 5 to overheat the gases received from the high-pressure compressor 36. As a consequence, said surplus reduces accordingly the heat which the burner 38 needs to produce to raise the temperature of the gases which will be involved in the following cycles at eleven hundred degrees Celsius.

As for the driving energy not recovered as a result of said truncation, that is lost.

Figure 9:
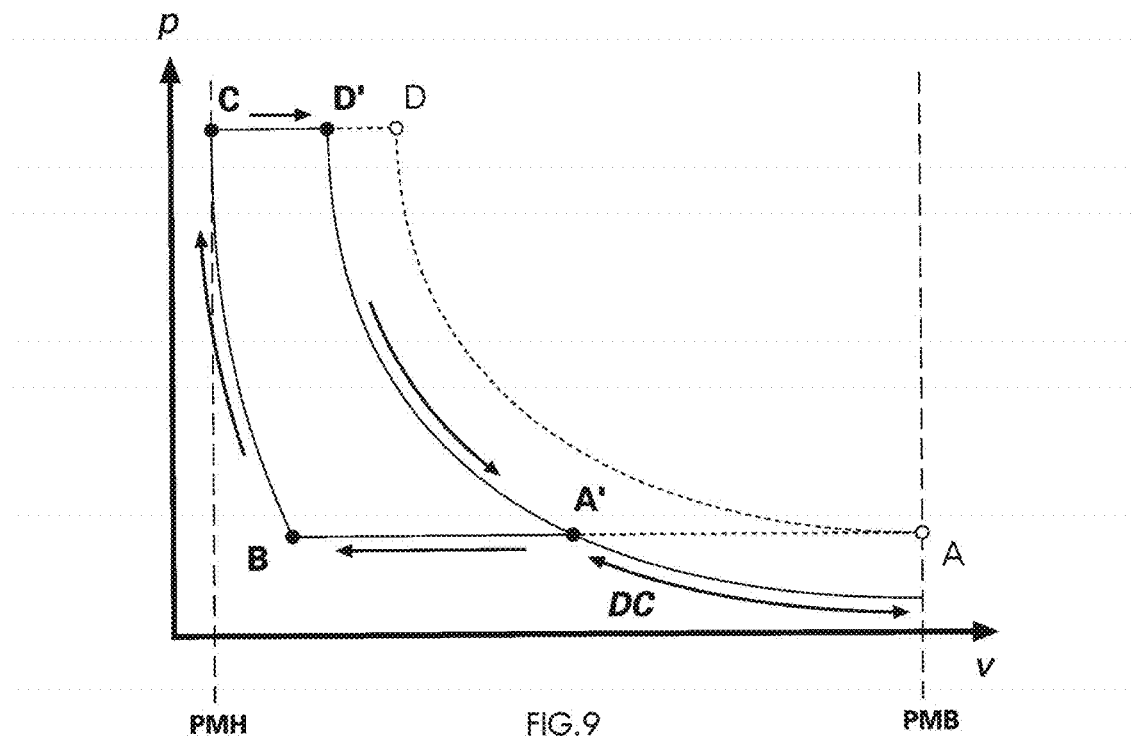
FIG. 9 is a pressure/volume diagram showing in schematic manner the cycle which can take place in the transfer-expansion chamber of the heat engine with transfer-expansion and regeneration according to the invention in order to reduce the torque of said engine.

The pressure/volume diagram of FIG. 9 in turn illustrates another control strategy of the admission metering valve 24 and the exhaust valve 31. Said variant is provided this time to reduce the specific torque of the heat engine with transfer-expansion and regeneration 1 according to the invention and thus to reduce the specific power of said engine 1 for the same speed. It may prove useful to modulate the power decrease of said engine 1 in many usage contexts.

In said diagram of FIG. 9, one notes that as compared to the diagram of FIG. 7, the moment of the closing "D" of the admission metering valve 24 has been advanced to the point marked "D'". Thus, less gases at eleven hundred degrees Celsius and twenty bars are transferred from the hot gas admission line 19 to the transfer-expansion chamber 16.

The result of this deficit of gas admitted is that the expansion piston 15 expands the gases up to its bottom dead center noted as "PMB" to a pressure less than one bar absolute. Thus, the strategy explained in FIG. 9 calls for the expansion piston 15 to recompress said gases until their pressure is one bar absolute and on the order of three hundred degrees Celsius. This expansion followed by a recompression is noted as "DC" in FIG. 9. The recompression of the gases occurs when the exhaust valve 31 opens at the point marked "A'" which is greatly delayed as compared to the point "A" noted in the same FIG. 9, reminiscent of the moment of opening of said valve 31 shown by FIG. 7.

As one notes in FIG. 9, the work area of the gases has been significantly reduced as compared to that shown in FIG. 7 without forfeiting the indicated efficiency of the heat engine with transfer-expansion and regeneration 1 according to the invention.

It will be noted that in order to effectively serve the strategy illustrated in FIG. 9, the compressor 2 must take in less atmospheric air via the compressor inlet line 3. For this, as illustrated in FIG. 3, said compressor 2 can have a compressor admission metering valve 66 whose opening and closing are controlled by a compressor admission metering valve actuator 67 so as to admit more or less atmospheric air.

As an alternative illustrated in FIG. 1, a throttle to regulate the admitted air 142 can be provided on the compressor inlet line 3 to regulate the admission pressure of the compressor 2.

Figure 10:
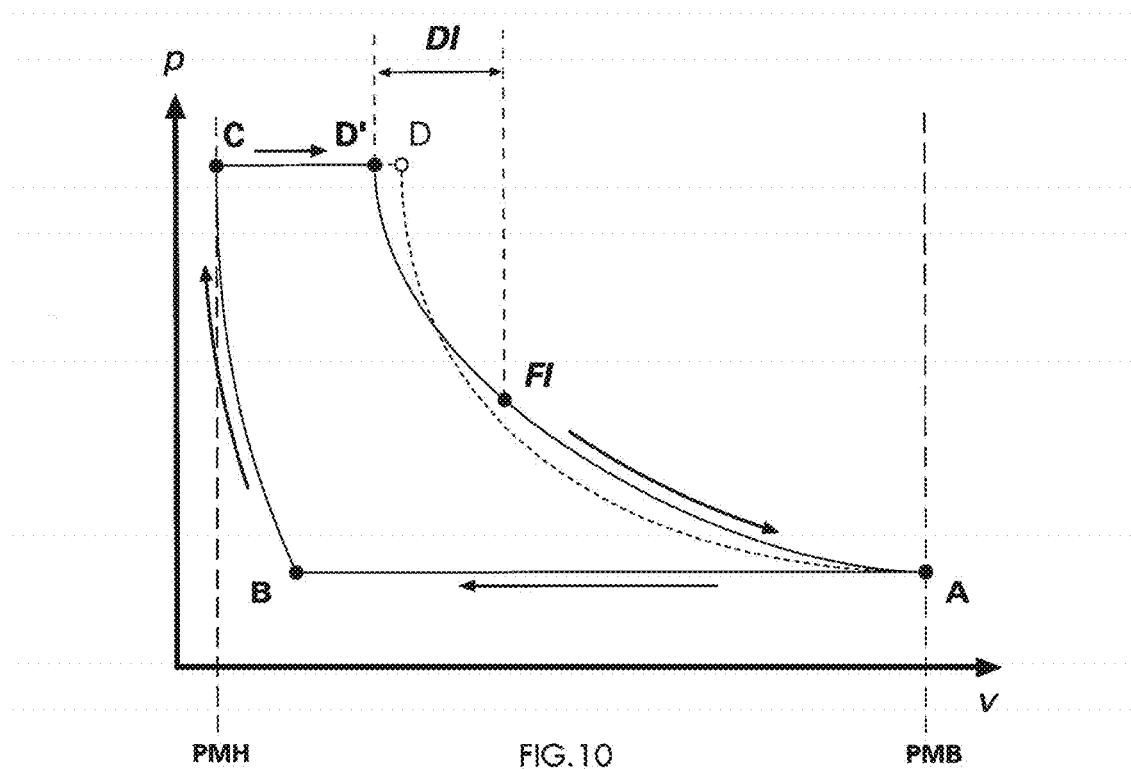
FIG. 10 is a pressure/volume diagram showing in schematic manner the cycle which can take place in the transfer-expansion chamber of the heat engine with transfer-expansion and regeneration according to the invention in order to maximize the torque of said engine by means of a temperature maintaining fuel injector.

Another strategy illustrated in FIG. 10 consists in limiting or even abolishing the drop in temperature of the gases during their expansion so as to maximize the efficiency of the heat engine with transfer-expansion and regeneration 1. This strategy requires the use of a temperature maintaining fuel injector 140 whose nozzle emerges into the transfer-expansion chamber 16.

As will be noted, that work area of the gases of said FIG. 10 is comparable in surface to that of FIG. 7. Even so, one also notes that as compared to the diagram of FIG. 7, the moment of closing "D" of the admission metering valve 24 has been advanced to the point marked "D'". This means that less work is done by the compressor 2 to end up with a comparable work area produced by the expansion piston 15.

One notes that this strategy can be used without having to increase the maximum temperature of the gases, which remains at eleven hundred degrees Celsius. To achieve this result, once the admission metering valve 24 is closed as the point marked "D'", the temperature maintaining fuel injector 140 injects fuel into the hot gases during their expansion, said fuel being instantaneously ignited upon contact with said hot gases, the latter being furthermore still rich in oxygen.

The flow rate of said fuel is calculated for example so that the temperature of said gases remains in the vicinity of eleven hundred degrees Celsius despite the expanding of said gases during the entire injection process noted as "DI" in FIG. 10.

The end of injection noted as "FI" in FIG. 10 is calculated so that the temperature of the gases at the end of the expansion remains acceptable—for example six hundred degrees Celsius—taking into account the thermomechanical strength of the regeneration heat exchanger designed to receive these gases.

One notes that the strategy illustrated in FIG. 10 necessarily brings the temperature of the gases at the end of stroke BC to more than eleven hundred degrees Celsius. Taking this into account, and to prevent the excessive formation of nitrogen oxides, the transfer-expansion chamber 16 can have—besides the temperature maintaining fuel injector 140—an anti-NOx water injector 141 which can inject water into said chamber 16 in order to maintain the temperature of the hot gases contained in said chamber 16 below the threshold of massive formation of nitrogen oxides.

One notices that, since the temperature higher than eleven hundred degrees Celsius is only found at the end of stroke BC for a very short duration, said temperature does not have significant impact on the thermomechanical strength of the expansion cylinder 13, the expansion cylinder heads 14 or the expansion piston 15.

As one can easily imagine, another way of using the temperature maintaining fuel injector 140 is to temporarily raise the temperature of the hot gases admitted into the transfer-expansion chamber 16 by the admission metering valve 24 at the moment of admission of said gases into said chamber 16. In FIG. 7, this would translate into a fuel injection occurring during the stroke CD. The result of this strategy is an increase in the efficiency of the heat engine with transfer-expansion and regeneration 1 according to the invention without endangering the thermomechanical strength of its principal components, yet in return for a production of exhaust gas whose content of nitrogen oxides is potentially elevated.

In this case, the expanded gas exhaust line 26 can include, for example, a catalyst for aftertreatment of nitrogen oxides to urea (not shown), this latter advantageously having an elevated gas temperature to reduce said oxides.

It will be noted that for optimal efficacy of the heat engine with transfer-expansion and regeneration 1, the temperature of the internal walls of the high-pressure regeneration outlet line 9, the hot gas admission line 19, the expansion cylinder 13 and the expansion cylinder head 14 is similar to that of the hot gases contained in these various elements 9, 19, 13 and 14. This makes it possible to operate the cycle illustrated in FIG. 7 in almost adiabatic fashion. For this, said elements are made for example of ceramic based on alumina, zirconia, or silicon carbide. Moreover, as illustrated by FIG. 6, the admission metering valve 24 and the exhaust valve 31 as well as their respective seats and guides are locally cooled by a valve cooling circuit 51 in which a heat transfer agent circulates.

Once the cycle has been carried out allowing the expansion piston 15 to provide the desired work on the power output shaft 17, the gases expelled by said piston 15 into the expanded gas exhaust line 26 reach the low-pressure regeneration line 7 of the regeneration heat exchanger 5. In this line 7, said gases give up a portion of their heat to the air circulating in the high-pressure regeneration line 6. As a consequence, the temperature of said gases falls to around ninety degrees Celsius, while their pressure remains unchanged at around one bar absolute. Said gases are then released into the atmosphere.

It will be observed that in order to confer the best possible efficiency on the heat engine with transfer-expansion and regeneration 1 according to the invention, from the outlet of the high-pressure compressor and up to the engine outlet line 33, the various hot elements and lines making up said engine 1 can be coated with a heat insulating material and/or structure which limits the heat losses. As a nonlimiting example, said material can be any refractory and isothermal type known to the skilled person, while said structure can take the shape of at least a heat shield.

Moreover, one will not the determining role of the piston sealing means 53 which—especially when comprised of a continuous perforated ring 105—confer on the heat engine with transfer-expansion and regeneration 1 according to the invention an effective and durable functioning because in fact it is essential to guarantee the best possible tightness between the expansion piston 15 and the expansion cylinder 13, under the best possible operating conditions.

The functioning of said piston sealing means 53 of the heat engine with transfer-expansion and regeneration 1 according to the invention is particularly comprehensible by looking at FIGS. 19 and 20 which show merely as an illustration and teaching the ring sealing means 110 comprised of an O-ring 132.

It will be notes that in said FIGS. 19 and 20 symbols "+" and "−" surrounded by a circle have been added to illustrate the difference between the pressure prevailing in the pressure distribution chamber 119 on the one hand and that prevailing in the pressure distribution groove 126, the counterpressure groove 117 and the transfer-expansion chamber 16 on the other hand.

Let us assume that the maximum pressure prevailing in the transfer-expansion chamber 16 is twenty bars, while the source of pressurized fluid 112 produces a flow rate of ring fluid 113 whose maximum pressure is forty bars. These pressure values are given as an illustration and do not in any way limit the pressure variants which can be adopted by the skilled person involved in designing the heat engine with transfer-expansion and regeneration 1 according to the invention.

One will note in FIGS. 1 and 2 that, depending on the particular sample embodiment of the heat engine with transfer-expansion and regeneration 1 according to the invention represented there, the source of pressurized fluid 112 is a piston-type pneumatic fluid compressor 120 driven by the power output shaft 17. Advantageously, the piston of the low-pressure compressor 35 and that of the high-pressure compressor 36 are equally outfitted with sealing means similar to those of the expansion piston 15, thus said means themselves making use of a source of pressurized fluid 112. One will note in said FIGS. 1 and 2 that the source of pressurized fluid 112 feeding the pressure chamber 129 which cooperates in the sealing of the piston of the low-pressure compressor 35 is none other than the high-pressure compressor 36, while the piston-type compressor of pneumatic fluid 120 feeds the pressure chambers 129 which cooperate in the sealing of the piston of the high-pressure compressor 36 and the expansion piston 15.

It will also be noticed in FIGS. 1 and 2 that the inlet of the compressor of pneumatic fluid 120 is connected to the outlet of the high-pressure compressor 36 via a ring fluid cooler 54 and then a ring fluid filter 138. In these same FIGS. 1 and 2, one notes that the outlet of the compressor of pneumatic fluid 120 is directly connected to the pressure chamber 129 which cooperates in the sealing of the piston of the high-pressure compressor 36, while said outlet can be connected to the pressure chamber 129 which cooperates in the sealing of the piston of the expansion piston 15 either directly or via a ring fluid cooler 54 depending on the position of a ring fluid temperature regulator 55. Thus, the ring fluid temperature regulator 55 makes it possible to regulate the temperature of the ring fluid 113 which is introduced into the pressure chamber 129 which cooperates in the sealing of the piston of the expansion piston 15.

FIG. 19 shows said piston sealing means 53 of the heat engine with transfer-expansion and regeneration 1 according to the invention when the source of pressurized fluid 112 is just starting to put out ring fluid 113 and the pressure distribution chamber 119 is just starting to rise in pressure. We shall assume that, at this stage, the pressure prevailing in the transfer-expansion chamber 16 is still only one bar absolute.

One notes that, the pressure distribution chamber 119 being made tight in particular thanks to the O-ring 132, the ring fluid 113 has no other outlet than the calibrated orifice 111 to escape from said chamber 119. In the operating stage of said piston sealing means 53 of the heat engine with transfer-expansion and regeneration 1 according to the invention as illustrated in FIG. 19, the full flow rate of ring fluid 113 coming from the source of pressurized fluid 112 has not yet been established, so that the pressure prevailing in the pressure distribution chamber 119 is only ten bars. Even though the pressure of forty bars has not yet been produced by the source of pressurized fluid 112, one notes that the continuous perforated ring 105 begins to swell, despite the leakage of ring fluid 113 via the calibrated orifice 111, since the pressure prevailing in the pressure distribution chamber 119 is greater than that prevailing in the pressure distribution groove 126, the counterpressure groove 117 and the transfer-expansion chamber 16. The swelling of the continuous perforated ring 105 is symbolized by the dotted arrow. The flow rate of ring fluid 113 escaping through the calibrated orifice 111 returns to the transfer-expansion chamber 16 respectively via the pressure distribution groove 126, the counterpressure groove 117 and the gap formed by the play between the expansion piston 15 and the expansion cylinder 13.

It will be noted that the cross section of the calibrated orifice 111 and the flow rate of ring fluid 113 generated by the source of pressurized fluid 112 are calculated so that the pressure of forty bars—when it is effectively produced by said source 112—can be maintained in the pressure distribution chamber 119 even though the ring fluid 113 is escaping through the calibrated orifice 111. This comes down to saying that if no obstacle limits the swelling of the continuous perforated ring 105, the latter receives a sufficient flow of ring fluid 113 on the part of the source of pressurized fluid 112 to swell as much as if it were perfectly tight, that is, as much as if it did not have a calibrated orifice 111.

The radial thickness of the continuous perforated ring 105 is itself calculated so that—taking into account the elasticity of the material making up said ring 105—when a pressure of forty bars is applied to the internal cylindrical ring surface 106, the outer diameter of the continuous perforated ring 105 is at least equal to if not greater than the inner diameter of the expansion cylinder 13.

As the pressure rises gradually in the pressure distribution chamber 119, the diameter of the continuous perforated ring 105 increases until the air cushion floating surfaces 116 are at a very slight distance from the wall of the expansion cylinder 13. This is what is shown in FIG. 20.

At this stage of functioning of said piston sealing means 53 of the heat engine with transfer-expansion and regeneration 1 according to the invention, a significant head loss is created between the air cushion floating surfaces 116 and the expansion cylinder 13, said loss opposing the passage of the ring fluid 113. As a consequence, the pressure which prevails in the pressure distribution groove 126 and the counterpressure groove 117 increases to the point of being close to that which prevails in the pressure distribution chamber 119. The result is that the pressure prevailing in said chamber 119 no longer exerts a radial force on the continuous perforated ring 105 except in the area of the air cushion floating surfaces 116. Subsequently to this, due to its elasticity which gives it the properties of a spring and which renders it resistant to the swelling, the continuous perforated ring 105 contracts, which has the effect on the one hand of reducing the head loss between the air cushion floating surfaces 116 and the expansion cylinder 13 and on the other hand of lowering the pressure prevailing in the pressure distribution groove 126 and the counterpressure groove 117, which causes the continuous perforated ring 105 to swell again.

As one can confirm, the force of constriction resulting from the stiffness of the continuous perforated ring 105 and opposing the swelling of the latter on the one hand, and the head loss created between the air cushion floating surfaces 116 and the expansion cylinder 13 on the other hand, lead to a relatively unstable situation of the continuous perforated ring 105. In fact, when the diameter of this ring 105 increases, the conditions having led to said diameter increase disappear, while when the diameter of said ring 105 diminishes, the conditions having led to said increase are again in place.

The result of this is that the air cushion floating surfaces 116 have no other choice but to take up an intermediate relatively stable position at very short distance from the expansion cylinder 13. Said distance results from the initial play between the expansion piston 15 and the expansion cylinder 13, from the pressure prevailing in the pressure distribution chamber 119, from the stiffness of the continuous perforated ring 105, and from the total axial length of the air cushion floating surfaces 116 in relation to the total axial length of the internal cylindrical ring surface 106 which is exposed to the pressure of the ring fluid 113. Said distance also results from the depth of the counterpressure groove 117 which itself constitutes an additional head loss.

According to the sample functioning considered here, once the pressure of forty bars is established in the pressure distribution chamber 119, the distance between the air cushion floating surfaces 116 and the expansion cylinder 13 is on the order of either a few microns, or on the order of a micron, or even a fraction of a micron. It is this short distance which, combined with a flow of ring fluid 113 still going from the counterpressure cavity 115 to the transfer-expansion chamber 16 and not in reverse, produces an excellent sealing between the expansion piston 15 and the expansion cylinder 13.

One will note that, taking into account the particular mode of functioning of said piston sealing means 53 of the heat engine with transfer-expansion and regeneration 1 according to the invention, the continuous perforated ring 105 has a natural tendency to become centered in the expansion cylinder 13 and to accommodate itself to any defects in circularity or cylindricity of said 13. In fact, the position of the continuous perforated ring 105 results from an equilibrium between, first, the general force of constriction of said ring 105 due to its stiffness and, secondly, the local radial forces applied at each point of the periphery and of the axial length of the continuous perforated ring 105, said forces resulting from the aerodynamic interaction between the air cushion floating surfaces 116 and the expansion cylinder 13.

It will also be noted that said piston sealing means 53 of the heat engine with transfer-expansion and regeneration 1 according to the invention enable various adjustment in their design. For example, all other things being equal, the dimensioning of the cross section of the calibrated orifice 111 determines in particular the distance left between the air cushion floating surfaces 116 and the expansion cylinder 13, said distance being thus regulated by the stiffness of the continuous perforated ring 105, which depends in particular on its thickness.

From the functioning just described, one easily infers that it is essential for the pressure generated by the source of pressurized fluid 112 to be always greater than that prevailing in the transfer-expansion chamber 16. This does not exclude the possibility—on sufficiently long time scales—to adapt the pressure generated by the source of pressurized fluid 112 to the maximum pressure occurring in the transfer-expansion chamber 16. However, it will be noted that if the pressure chamber 129 has a proportional pressure check valve 140, the pressure prevailing in the pressure distribution chamber 119 can vary over short time scales like the pressure prevailing in the transfer-expansion chamber 16. This strategy can be adopted, for example, if the expansion piston 15 of the heat engine with transfer-expansion and regeneration 1 according to the invention which receives said piston sealing means 53 only defines with the expansion cylinder 13 a single transfer-expansion chamber 16.

Thus, it will be understood that said piston sealing means 53 of the heat engine with transfer-expansion and regeneration 1 according to the invention constitute a robust solution to produce an effective and durable seal between the expansion piston 15 and the expansion cylinder 13.

In fact, the heat engine with transfer-expansion and regeneration 1 according to the invention requires the operating temperature of the expansion cylinder 13 and the expansion piston 15 to be on the order of a thousand degrees Celsius or more. At such a temperature, one cannot use any kind of oil lubrication of a segment or a ring. Moreover, regardless of the material used to make said cylinder 13 and said piston 15, whether ceramics based on alumina, zirconia, or silicon carbide, or any other material, at such a temperature any contact between said cylinder 13 and a sealing segment or gasket is impossible.

Even so, said piston sealing means 53 of the heat engine with transfer-expansion and regeneration 1 according to the invention are indeed compatible with such operating conditions. In fact, the continuous perforated ring 105 never touches the expansion cylinder 13, since it is separated from the latter by a film of ring fluid 113 which can be—as a nonlimiting example—the air of the atmosphere. Moreover, the continuous perforated ring 105 is constantly cooled by the flow of ring fluid 113 passing through it and sweeping the internal cylindrical ring surface 106 and the la external cylindrical ring surface 107. It should be kept in mind that, to help in this cooling, the pressure distribution chamber 119 can house means of diffusion of ring fluid 124 such as those shown in FIGS. 13 to 18. Said cooling in particular allows the use of a continuous perforated ring 105 made of steel with the desired mechanical strength, without going beyond the annealing temperature of that steel, which is only several hundred degrees Celsius. The use of a continuous perforated ring 105 made of steel brought to several hundred degrees in an expansion cylinder 13 made of ceramic brought to more than a thousand degrees Celsius furthermore lets one control the functional play between said ring 105 and said cylinder 13 under good conditions, which is easily proven by calculation. This is due in particular to the coefficient of expansion of the steel, which is greater than that of the ceramic, whether or not said steel is covered with a layer protecting it against oxidation.

One also notes that the cooling of the continuous perforated ring 105 has as its corollary the local heating of the ring fluid 113. This on the one hand allows increasing the volumetric flow rate of said fluid 113 even to a mass flow rate and on the other hand increasing the viscosity and thus the buoyancy of said fluid 113, if for example it is constituted of atmospheric air. This advantageously allows a reducing of the flow rate of ring fluid 113 produced by the source of pressurized fluid 112 while allowing the piston sealing means 53 of the heat engine with transfer-expansion and regeneration 1 according to the invention to function under the desired conditions. One also notes that it is possible to regulate the temperature of the ring fluid 113 before introducing it into the pressure chamber 129, which makes it possible to regulate the operating temperature of the continuous perforated ring 105 and, thus, the functional play between said ring 105 and the expansion cylinder 13.

One will also note that the flow rate of ring fluid 113 flowing between the air cushion floating surfaces 116 and the expansion cylinder 13 ensures a permanent cleaning of the latter. Thus, the particles and residues of every kind cannot stick to the expansion cylinder 13. Moreover, it is not possible for a particle coming from the transfer-expansion chamber 16 to pass between the air cushion floating surfaces 116 and the expansion cylinder 13 because the pressure of the gases in said chamber 16 is less than that prevailing in the pressure distribution chamber 119. One will note that, to guarantee an optimal functioning of the air cushion floating surfaces 116, as shown in FIGS. 1 and 2, it is possible to provide a ring fluid filter 138 which cleanses the ring fluid 113 of any particles whose diameter is, for example, greater than one micron before said fluid 113 is introduced into the pressure distribution chamber 119.

FIG. 3 illustrates one variant of the heat engine with transfer-expansion and regeneration 1 according to the invention, whereby the compressor 2 is no longer composed of a low-pressure compressor 35 and a high-pressure compressor 36, but of a single dual-action piston type compressor. One notes, however, in FIG. 3 that said compressor 2 cooperates with a water injector 56 which sprays liquid water 57 into the gases circulating in the compressor inlet line 3 before said gases are introduced into the suction-delivery chamber 58 of said compressor 2.

The result of this addition of liquid water 57 in said gases is that a compression near the isotherm of said gases occurs in the suction-delivery chamber 58. In fact, during their compression, said gases loaded with droplets of liquid water 57 surrender their heat to said droplets. Thus, a portion of the liquid water 57 contained in said droplets is vaporized when said surrounding gases give up the corresponding latent heat of the liquid water 57, while the other portion remains in the liquid state and rises in temperature, said gases surrendering to said other portion the corresponding sensible heat of the liquid water 57.

The result of this strategy is a significant reduction in the work tapped from the power output shaft 17 to compress said gases. This reduction in work resistant to compression translates into an increased efficiency of the heat engine with transfer-expansion and regeneration 1 according to the invention.

Once the mixture of gas and liquid water 57 has been expelled from the compressor 2 via the compressor outlet line 4, the air/water separator 59 is tasked with recovering the nonvaporized liquid water 57 which may be injected once again after having been cooled in the liquid water cooler 77.

One notes that the fraction of the liquid water 57 vaporized in the compressor 2 constitutes an additional gas mass destined to be brought up to a temperature of, for example, eleven hundred degrees Celsius in the burner 38 before being expanded by the expansion piston 15. The additional useful work thus produced is likewise favorable to the efficiency of the heat engine with transfer-expansion and regeneration 1 according to the invention.

One will note—again referring to FIG. 3—that to compensate for the loss of the vaporized fraction of liquid water 57 in the compressor 2, a condensation gas dryer 60 can be provided on the engine outlet line 33. Said dryer 60 has the function of condensing a portion of the water vapor remaining in the gases expelled from the low-pressure regeneration line 7, said vapor coming at the same time from the vaporization in the compressor 2 of the liquid water 57 previously sprayed by the water injector 56 into the compressor inlet line 3, and from the combustion of hydrocarbons in the combustion chamber 40, said combustion producing water by combination of hydrogen of the fuel with the oxidizer which, in the present case and according to this sample embodiment of the heat engine with transfer-expansion and regeneration 1 according to the invention, is atmospheric oxygen.

It will be understood that the variant of the heat engine with transfer-expansion and regeneration 1 according to the invention as illustrated in FIG. 3 is—due to it relative complexity—particularly adapted to mobile industrial applications such as maritime propulsion, or stationary ones such as pumped storage or compression type electric power plants. However, reserving a certain miniaturization and adequate integration efforts, said variant can also be addressed to heavy or light highway transport, or any other application without any restriction.

The possibilities of the heat engine with transfer-expansion and regeneration 1 according to the invention are not limited to the applications just described and it should furthermore be understood that the preceding specification was given only as an example and in no way limits the scope of said invention which will not be by replacing the described execution details with any other equivalent ones.

The invention claimed is:
1. Heat engine with transfer-expansion and regeneration (1), which comprises:
at least one compressor (2) to aspirate gases at a certain pressure via a compressor inlet line (3) and drive them out at a higher pressure in a compressor outlet line (4);

at least one regeneration heat exchanger (5) comprised of at least one high-pressure regeneration line (6) and at least one low-pressure regeneration line (7), a first end (8) of said high-pressure line (6) being connected to the compressor outlet line (4) while the gases circulating in the low-pressure regeneration line (7) can surrender a portion of their heat to the gases circulating in the high-pressure regeneration line (6);

at least one regenerator high-pressure outlet line (9) having a first end (10) connected to a second end (11) comprising the high-pressure regeneration line (6);

at least one heat source (12) placed in any given location of the regenerator high-pressure outlet line (9) and which can superheat gases circulating in said line (9);

at least one expansion cylinder (13), at least one end of which is closed by an expansion cylinder head (14) integrated in said expansion cylinder (13) or attached to the expansion cylinder, said expansion cylinder (13) housing an expansion piston (15) with which the expansion cylinder produces a tightness to form a transfer-expansion chamber (16) of variable volume, said expansion piston (15) being able to move in said expansion cylinder (13) and being directly or indirectly connected to a power output shaft (17) by mechanical transmission means (18) so as to impart to said shaft (17) a continuous rotation movement when said expansion piston (15) performs reciprocating movements in the expansion cylinder (13);

at least one admission line for hot gases (19), having a first end (20) connected to a second end (21) comprising the regenerator high-pressure outlet line (9), said admission line for the hot gases (19) having a second end (22) which passes through the expansion cylinder head (14) to empty into the expansion cylinder (13) via a mouth of the admission line (23) for the hot gases;

at least one admission metering valve (24) operated by a metering valve actuator (25), said valve (24) being able to open or block the mouth of the hot gas admission line (23) for the hot gases;

at least one exhaust line (26), having a first end (27) which passes through the expansion cylinder head (14) to empty into the expansion cylinder (13) via a mouth of the exhaust line (28), said exhaust line (26) also having a second end (29) connected to a first end (30) comprising the low-pressure regeneration line (7);

at least one exhaust valve (31) operated by an exhaust valve actuator (32), said valve (31) being able to open or block the mouth of the exhaust line (28);

at least one engine outlet line (33) placed in a prolongation of a second end (34) comprising the low-pressure regeneration line (7), or combined with said second end (34) to constitute a single piece with the second end.

2. Heat engine with transfer-expansion and regeneration according to claim 1, wherein the compressor (2) is two-stage and is comprised of a low-pressure compressor (35) whose outlet is connected to an inlet of a high-pressure compressor (36) via an intermediate compressor cooler (37).

3. Heat engine with transfer-expansion and regeneration according to claim 1, wherein the power output shaft (17) drives the compressor (2) in rotation.

4. Heat engine with transfer-expansion and regeneration according to claim 1, wherein the compressor inlet line (3) has a water injector (56) which can spray liquid water (57) into the gases circulating in said line (3) before said gases are admitted into a suction-delivery chamber (58) which is defined by the compressor (2) aspirating said gases.

5. Heat engine with transfer-expansion and regeneration according to claim 1, wherein the compressor (2) defines a suction-delivery chamber (58) in which a water injector (56) empties, the water injector being able to spray liquid water (57) into the gases admitted into said chamber (58) after said gases have been aspirated via the compressor inlet line (3) by said compressor (2).

6. Heat engine with transfer-expansion and regeneration according to claim 4, wherein the compressor outlet line (4) has an air/water separator (59).

7. Heat engine with transfer-expansion and regeneration according to claim 4, wherein the engine outlet line (33) has a condensation gas dryer (60).

8. Heat engine with transfer-expansion and regeneration according to claim 1, wherein the compressor (2) has a compressor admission metering valve (66) whose opening and closing are controlled by a compressor admission metering valve actuator (67), said valve (66) being able to open and make a connection between the compressor inlet line (3) and a suction-delivery chamber (58) which is defined by the compressor (2).

9. Heat engine with transfer-expansion and regeneration according to claim 1, wherein the high-pressure regeneration line (6) and the low-pressure regeneration line (7) are placed side by side for all or some of their length, the direction of circulation of the gases contained in the high-pressure regeneration line (6) being opposite the direction of circulation of the gases contained in the low-pressure regeneration line (7), the two said lines (6, 7) constituting a counterflow heat exchanger (41).

10. Heat engine with transfer-expansion and regeneration according to claim 1, wherein the heat source (12) is a burner (38) composed of a fuel injector (39) and a combustion chamber (40).

11. Heat engine with transfer-expansion and regeneration according to claim 1, wherein the heat source (12) is composed of a primary heat exchanger (46) which extracts heat from a universal heat source (47) to transmit said heat to the gases circulating in the high-pressure regenerator line (9) directly, or via a secondary heat transport circuit (48).

12. Heat engine with transfer-expansion and regeneration according to claim 1, wherein the expansion cylinder head (14) has a pressure equalizing gate (49) which blocks or leaves open a line connecting the transfer-expansion chamber (16) and the admission line for the hot gases (19), said gate (49) being open if the pressure prevailing in the transfer-expansion chamber (16) is greater than that prevailing in the admission line for the hot gases (19), so that the gases pass from said chamber (16) to said line (19), the gate (49) being otherwise closed so that said gases cannot pass from said line (19) to said chamber (16) via said gate (49).

13. Heat engine with transfer-expansion and regeneration according to claim 1, wherein the transfer-expansion chamber (16) has at least one temperature maintaining fuel injector (140).

14. Heat engine with transfer-expansion and regeneration according to claim 1, wherein the transfer-expansion chamber (16) has at least one anti-NOx water injector (141).

15. Heat engine with transfer-expansion and regeneration according to claim 1, wherein the expansion piston (15) is connected to the mechanical means of transmission (18) by an expansion piston rod (68) which passes through the expansion cylinder head (14), a seal being achieved between said rod (68) and said expansion cylinder head (14) by rod sealing means (69).

16. Heat engine with transfer-expansion and regeneration according to claim 15, wherein the rod sealing means (69)

comprise an upper rod seal (70) and a lower rod seal (71), sufficiently spaced apart to form, between the two said seals (70, 71), an oil circulation chamber (72) in which empties a cooling and lubrication oil supply line (73) and from which emerges a cooling and lubrication oil outlet line (74).

17. Heat engine with transfer-expansion and regeneration according to claim 16, wherein the rod sealing means (69) cooperate with a rod guide collar (76) lodged inside or outside the oil circulation chamber (72).

18. Heat engine with transfer-expansion and regeneration according to claim 1, wherein the mechanical means of transmission (18) are composed of a connecting rod (42), one of whose ends articulates directly or indirectly in the expansion piston (15) and another end articulates about a crank (43) integrated with the power output shaft (17).

19. Heat engine with transfer-expansion and regeneration according to claim 1, wherein the admission metering valve (24) and/or the exhaust valve (31) is guided directly or indirectly in a valve cage (50) housed in the expansion cylinder head (14), said cage (50) having a seat on which at least one of said valves (24, 31) can rest to form a seal, while said seat and/or the portion of the valve cage (50) guiding at least one of said valves (24, 31) is cooled by a valve cooling circuit (51) in which a heat transfer fluid circulates.

20. Heat engine with transfer-expansion and regeneration according to claim 1, wherein the expansion piston (15) has piston sealing means (53).

21. Heat engine with transfer-expansion and regeneration according to claim 20, wherein the piston sealing means (53) comprise:
- at least one continuous perforated ring (105), having an internal cylindrical ring surface (106), an external cylindrical ring surface (107) and two axial ring surfaces (108), said ring (105) being lodged in at least one annular groove (109) arranged in the expansion piston (15) while said ring (105) can move radially in the annular groove (109) without being able to exit from the annular groove;
- ring sealing means (110) which produce a seal between each axial ring surface (108) and the annular groove (109), so that the annular groove defines with the continuous perforated ring (105) a pressure distribution chamber (119) connected by a transfer circuit (114) to a source of pressurized fluid (112);
- at least one calibrated orifice (111) passing entirely through the continuous perforated ring (105) in its radial thickness;
- at least one air cushion floating surface (116) of the continuous perforated ring (105), said floating surface (116) being arranged opposite the pressure distribution chamber (119).

22. Heat engine with transfer-expansion and regeneration according to claim 21, wherein the piston sealing means (53) comprise at least one counterpressure cavity (115) which is not axially emergent and which is hollowed out at the external cylindrical ring surface (107) so that the surface of the external cylindrical ring surface (107) not occupied by said cavity (115) constitutes the air cushion floating surface (116).

23. Heat engine with transfer-expansion and regeneration according to claim 21, wherein the piston sealing means (53) comprise a counterpressure cavity (115) which is composed of a counterpressure groove (117) of slight depth, more or less centered on the axial length of the external cylindrical ring surface (107), said counterpressure groove (117) being made on the entire circumference of said external cylindrical ring surface (107).

24. Heat engine with transfer-expansion and regeneration according to claim 22, wherein the calibrated orifice (111) emerges into the counterpressure cavity (115).

25. Heat engine with transfer-expansion and regeneration according to claim 21, wherein the calibrated orifice (111) emerges into the counterpressure cavity (115) by means of a pressure distribution cavity (125) hollowed out at the bottom of said counterpressure cavity (115).

26. Heat engine with transfer-expansion and regeneration according to claim 25, wherein the pressure distribution cavity (125) is composed of a pressure distribution groove (126) more or less centered on the axial length of the external cylindrical ring surface (107), said pressure distribution groove (126) being made on the entire circumference of said external cylindrical ring surface (107).

27. Heat engine with transfer-expansion and regeneration according to claim 21, wherein the external cylindrical ring surface (107) or the internal cylindrical ring surface (106) comprises two axial edges, at least one of the two axial edges of the external cylindrical ring surface (107) or the internal cylindrical ring surface (106) receiving the counterpressure cavity (115) terminates in an edge plating clearance (118).

28. Heat engine with transfer-expansion and regeneration according to claim 21, wherein the ring sealing means (110) are composed of a ring sealing lip (121) integrated with the continuous perforated ring (105), and wherein further the ring sealing means establish a tight contact with the inside or the rim of the annular groove (109).

29. Heat engine with transfer-expansion and regeneration according to claim 21, wherein the ring sealing means (110) are composed of a thinned axial portion (139) disposed near at least one axial end of the continuous perforated ring (105), said portion (139) being integrated with the annular groove (109) in tight manner, and being sufficiently flexible to allow a diameter of the continuous perforated ring (105) to expand or decrease with respect to that of said groove (109).

30. Heat engine with transfer-expansion and regeneration according to claim 21, wherein the continuous perforated ring (105) is made of a flexible material and comprises at least one circumferential annular spring (123) which tends to reduce the diameter of said ring (105).

31. Heat engine with transfer-expansion and regeneration according to claim 21, wherein the pressure distribution chamber (119) houses means of diffusion of ring fluid (124) which force the ring fluid (113) from the pressure transfer circuit (114) to sweep a largest possible surface of the internal cylindrical ring surface (106) before escaping via the calibrated orifice (111).

32. Heat engine with transfer-expansion and regeneration according to claim 31, wherein the means of diffusion of ring fluid (124) are composed of a diffusion plate (136) lodged at a bottom of the annular groove (106), at least one of the axial ends of said plate (136) being provided with at least one orifice or lateral groove of the diffusion plate (137) which forces the ring fluid (113) coming from the pressure transfer circuit (114) to empty into the pressure distribution chamber (119) by at least one of its axial ends.

33. Heat engine with transfer-expansion and regeneration according to claim 21, wherein the annular groove (109) has a radial annular end stop (127) which limits the penetration of the continuous perforated ring (105) into said groove (109).

34. Heat engine with transfer-expansion and regeneration according to claim 21, wherein the pressure transfer circuit (114) is composed of a pressure inlet pipe (128), parallel to the expansion cylinder (13) and integrated with the expansion piston (15), a first end of said pipe (128) emptying inside said expansion piston (15) while a second end of said pipe (128) empties, via a bore of the pressure chamber (130) in which it can be displaced longitudinally and in tight manner, into a pressure chamber (129) connected to the source of pressurized fluid (112).

35. Heat engine with transfer-expansion and regeneration according to claim 34, wherein the pressure inlet pipe (128) is connected to the pressure distribution chamber (119) by at least one radial pressure inlet line (131).

36. Heat engine with transfer-expansion and regeneration according to claim 34, wherein the pressure chamber (129) is connected to the source of pressurized fluid (112) via a proportional pressure check valve which allows the ring fluid (113) to flow from said source (112) to said chamber (129), but not from said chamber (129) to said source (112).

37. Heat engine with transfer-expansion and regeneration according to claim 21, wherein the annular groove (109) houses an expansion spring (133) which bears against said groove (109) to exert a radial force on the internal cylindrical ring surface (106).

38. Heat engine with transfer-expansion and regeneration according to claim 37, wherein the expansion spring (133) makes contact with and produces a seal between the annular groove (109) and the continuous perforated ring (105).

39. Heat engine with transfer-expansion and regeneration according to claim 31 wherein the annular groove (109) houses an expansion spring (133) which bears against said groove (109) to exert a radial force on the internal cylindrical ring surface (106), and the expansion spring (133) is provided with at least one fluid diffusion orifice (134) and/or at least one fluid diffusion groove (135) so as to constitute with said fluid diffusion orifice (134) and/or said groove (135) the means of diffusion of ring fluid (124).

* * * * *